(12) United States Patent
Cha et al.

(10) Patent No.: US 12,137,499 B2
(45) Date of Patent: Nov. 5, 2024

(54) OPERATING METHOD FOR COMMUNICATION PROFILE AND ELECTRONIC DEVICE SUPPORTING THE SAME

(71) Applicant: Samsung Electronics Co., Ltd., Gyeonggi-do (KR)

(72) Inventors: Soon Hyun Cha, Gyeonggi-do (KR); Sun Min Hwang, Gyeonggi-do (KR); Tae Sun Yeoum, Seoul (KR); Duckey Lee, Seoul (KR); Sang Soo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 281 days.

(21) Appl. No.: 17/411,784

(22) Filed: Aug. 25, 2021

(65) Prior Publication Data
US 2021/0385645 A1   Dec. 9, 2021

Related U.S. Application Data

(63) Continuation of application No. 16/721,398, filed on Dec. 19, 2019, now Pat. No. 11,109,225, which is a
(Continued)

(30) Foreign Application Priority Data

Nov. 24, 2014 (KR) .................. 10-2014-0164688
Dec. 22, 2014 (KR) .................. 10-2014-0186446

(51) Int. Cl.
*H04W 8/24* (2009.01)
*G06F 1/16* (2006.01)
(Continued)

(52) U.S. Cl.
CPC ............ *H04W 8/24* (2013.01); *G06F 1/1626* (2013.01); *G06F 1/1637* (2013.01);
(Continued)

(58) Field of Classification Search
CPC ....... H04W 8/245; H04W 8/24; H04W 76/14; H04W 8/183; H04W 8/205; H04W 12/04;
(Continued)

(56) References Cited

U.S. PATENT DOCUMENTS 7,016,707 B2   3/2006   Fujisawa et al.
8,800,015 B2   8/2014   Christopher et al.
(Continued)

FOREIGN PATENT DOCUMENTS

CN   101888399       11/2010
CN   103039067 A  *  4/2013   ............. G06T 5/003
(Continued)

OTHER PUBLICATIONS

European Search Report dated Jul. 5, 2023 issued in counterpart application No. 19218919.9-1216, 5 pages.
(Continued)

*Primary Examiner* — David Q Nguyen
(74) *Attorney, Agent, or Firm* — The Farrell Law Firm, P.C.

(57) ABSTRACT

An electronic device is provided. The electronic device includes a touchscreen display; first communication circuitry to establish a short-range communication connection; second communication circuitry to establish a cellular communication connection; and a processor. The processor is adapted to establish, using the first communication circuitry, the short-range communication connection with a wearable device based at least in part on a graphical code being displayed on a display of the wearable device; based at least in part on a determination that an embedded subscription identity module (eSIM) profile is not installed on the wearable device, display, via the touchscreen display, a user interface (UI) to install the eSIM profile on the wearable device, the UI including one or more contract options
(Continued)

associated with a cellular network service for the wearable device; receive, via the touchscreen display, a user input to select at least one contract option from the one or more contract options; and transmit, using the second communication circuitry, a service subscription request corresponding to the at least one contract option to a first server associated with the cellular network service, such that the eSIM profile corresponding to the at least one contract option is installed on the wearable device based at least in part on the service subscription request.

14 Claims, 20 Drawing Sheets

Related U.S. Application Data continuation of application No. 16/160,620, filed on Oct. 15, 2018, now Pat. No. 10,531,280, which is a continuation of application No. 15/822,935, filed on Nov. 27, 2017, now Pat. No. 10,111,087, which is a continuation of application No. 14/950,996, filed on Nov. 24, 2015, now Pat. No. 9,832,638.

(51) Int. Cl.
  *H04M 1/02* (2006.01)
  *H04W 76/14* (2018.01)
  *H04W 8/18* (2009.01)
(52) U.S. Cl.
  CPC .......... *G06F 1/1643* (2013.01); *G06F 1/1656* (2013.01); *H04M 1/0266* (2013.01); *H04W 8/245* (2013.01); *H04W 76/14* (2018.02); *H04W 8/183* (2013.01)
(58) Field of Classification Search
  CPC ....... H04W 12/08; H04W 12/06; H04W 4/60; H04W 8/186; H04W 88/18; H04W 88/02; H04W 12/35; H04M 1/0266
  USPC .......... 361/818; 455/432.3, 437, 11.1, 151.2, 455/419
  See application file for complete search history.

(56) References Cited

U.S. PATENT DOCUMENTS

| | | | |
|---|---|---|---|
| 8,811,982 B2 | 8/2014 | Sato et al. | |
| 9,009,805 B1 | 4/2015 | Kirkby et al. | |
| 9,037,193 B2 | 5/2015 | Vergnes et al. | |
| 9,060,683 B2 | 6/2015 | Tran | |
| 9,119,051 B2 | 8/2015 | Christopher et al. | |
| 9,137,656 B2 | 9/2015 | O'Leary | |
| 9,173,085 B2 | 10/2015 | Cormier et al. | |
| 9,204,300 B2 | 12/2015 | Park et al. | |
| 9,253,617 B2 | 2/2016 | Cohen et al. | |
| 9,442,523 B2 | 9/2016 | Lee et al. | |
| 9,451,459 B2 | 9/2016 | Lee et al. | |
| 9,554,266 B2 | 1/2017 | Christopher et al. | |
| 9,560,471 B2 | 1/2017 | Lin et al. | |
| 9,572,016 B2 | 2/2017 | Cormier et al. | |
| 10,292,042 B2 | 5/2019 | Christopher et al. | |
| 2005/0070336 A1 | 3/2005 | Tamura | |
| 2007/0135175 A1 | 6/2007 | Matsuda | |
| 2009/0197673 A1 | 8/2009 | Bone et al. | |
| 2009/0287922 A1 | 11/2009 | Herwono et al. | |
| 2010/0062763 A1 | 3/2010 | Sato et al. | |
| 2010/0304670 A1 | 12/2010 | Shuo | |
| 2010/0311402 A1 | 12/2010 | Srnvasan et al. | |
| 2011/0136550 A1 | 6/2011 | Maugars | |
| 2011/0165896 A1 | 7/2011 | Stromberg et al. | |
| 2011/0307380 A1 | 12/2011 | Ido | |
| 2012/0190354 A1 | 7/2012 | Merrien et al. | |
| 2013/0205134 A1* | 8/2013 | Holtmanns | H04W 12/35 713/156 |
| 2013/0295913 A1 | 11/2013 | Matthews, III et al. | |
| 2013/0316681 A1 | 11/2013 | Huang et al. | |
| 2013/0318355 A1 | 11/2013 | Girard et al. | |
| 2013/0324091 A1 | 12/2013 | Girard et al. | |
| 2013/0325407 A1 | 12/2013 | Lee | |
| 2013/0329683 A1 | 12/2013 | Berard et al. | |
| 2014/0004827 A1 | 1/2014 | O'Leary | |
| 2014/0011541 A1 | 1/2014 | Cormier et al. | |
| 2014/0024343 A1 | 1/2014 | Bradley | |
| 2014/0031012 A1 | 1/2014 | Park et al. | |
| 2014/0031083 A1 | 1/2014 | Vergnes et al. | |
| 2014/0057680 A1 | 2/2014 | Proust et al. | |
| 2014/0106677 A1 | 4/2014 | Altman | |
| 2014/0106713 A1 | 4/2014 | Skog | |
| 2014/0141718 A1 | 5/2014 | Stromberg et al. | |
| 2014/0141747 A1 | 5/2014 | Merrien et al. | |
| 2014/0171151 A2 | 6/2014 | Cormier et al. | |
| 2014/0254499 A1 | 9/2014 | Hassan et al. | |
| 2014/0308942 A1 | 10/2014 | Christopher et al. | |
| 2014/0329502 A1 | 11/2014 | Lee et al. | |
| 2014/0375477 A1 | 12/2014 | Jain | |
| 2015/0038193 A1 | 2/2015 | Vergnes et al. | |
| 2015/0134958 A1 | 5/2015 | Merrien et al. | |
| 2015/0234986 A1 | 8/2015 | Dantsker et al. | |
| 2015/0372746 A1 | 12/2015 | Xie | |
| 2016/0006849 A1* | 1/2016 | Yang | G10L 25/51 455/563 |
| 2016/0044496 A1 | 2/2016 | Cormier et al. | |
| 2016/0050557 A1* | 2/2016 | Park | H04W 8/205 455/419 |
| 2017/0048645 A1 | 2/2017 | Yerrabommanahalli | |
| 2017/0048773 A1 | 2/2017 | Miao | |
| 2023/0162218 A1* | 5/2023 | Mazed | G06Q 30/0207 705/7.35 |

FOREIGN PATENT DOCUMENTS

| | | | | |
|---|---|---|---|---|
| CN | 104735642 A | * | 6/2015 | ............ H04W 76/11 |
| EP | 1 521 435 | | 4/2005 | |
| KR | 1020140109108 | | 9/2014 | |
| WO | WO-2013080024 A2 | * | 6/2013 | ............ G16H 20/30 |
| WO | WO 2014/005211 | | 1/2014 | |
| WO | WO-2014143916 A2 | * | 9/2014 | ............ G06Q 20/102 |

OTHER PUBLICATIONS

European Search Report dated Nov. 24, 2022 issued in counterpart application No. 20213397.1-1216, 5 pages.
European Search Report dated Aug. 8, 2018 issued in counterpart application No. 15195932.7-1214, 5 pages.
European Search Report dated Apr. 25, 2016 issued in counterpart application No. 15195932.7-1854, 10 pages.
European Search Report dated Mar. 10, 2020 issued in counterpart application No. 19202471.9-1212, 11 pages.
European Search Report dated Aug. 13, 2020 issued in counterpart application No. 19218919.9-1212, 12 pages.
Korean Office Action dated Sep. 28, 2020 issued in counterpart application No. 10-2014-0186446, 13 pages.
European Search Report dated Apr. 15, 2021 issued in counterpart application No. 20213397.1-1212, 12 pages.

* cited by examiner

OPERATING METHOD FOR COMMUNICATION PROFILE AND ELECTRONIC DEVICE SUPPORTING THE SAME

PRIORITY

This application is a Continuation Application of U.S. patent application Ser. No. 16/721,398, filed on Dec. 19, 2019, which is a Continuation Application of U.S. patent application Ser. No. 16/160,620, filed on Oct. 15, 2018, and issued as U.S. Pat. No. 10,531,280 on Jan. 7, 2020, which is a Continuation Application of U.S. patent application Ser. No. 15/822,935, filed on Nov. 27, 2017, and issued as U.S. Pat. No. 10,111,087 on Oct. 23, 2018, which is a Continuation Application of U.S. patent application Ser. No. 14/950,996, filed on Nov. 24, 2015, and issued as U.S. Pat. No. 9,832,638 on Nov. 28, 2017 and claims priority under 35 U.S.C. § 119(a) to Korean Patent Application Serial No. 10-2014-0164688, filed in the Korean Intellectual Property Office on Nov. 24, 2014, and Korean Patent Application Serial No. 10-2014-0186446, filed in the Korean Intellectual Property Office on Dec. 22, 2014, the entire contents of each of which are incorporated by reference herein in their entireties.

BACKGROUND

1. Field of the Disclosure

The present disclosure relates generally to a communication profile operating technology.

2. Description of the Related Art

A communication profile must be stored or installed in an electronic device in order for an electronic device to use a communication service via a base station. A user may visit an agency designated by a specific communication service provider to buy an electronic device and also download a communication profile to an electronic device for operating a communication service.

As electronic devices are sold by various sellers, a user may purchase an electronic device through various channels. However, since a communication profile is not pre-stored in an electronic device provided through certain channels, a communication service may not be immediately available upon receiving a newly-purchased electronic device. To use a communication service, the user may visit an agency or store designated by a specific communication service provider and may register the electronic device. However, this process may be an inconvenience for the user.

SUMMARY

The present disclosure has been made to address at least the above-mentioned problems and/or disadvantages and to provide at least the advantages described below. Accordingly, as aspect of the present disclosure is to provide a communication profile operating method for easily obtaining a communication profile of an electronic device using another electronic device, and an electronic device supporting the same.

In accordance with an aspect of the present disclosure, an electronic device is provided. The electronic device includes a touchscreen display; first communication circuitry to establish a short-range communication connection; second communication circuitry to establish a cellular communication connection; and a processor. The processor is adapted to establish, using the first communication circuitry, the short-range communication connection with a wearable device based at least in part on a graphical code being displayed on a display of the wearable device; based at least in part on a determination that an embedded subscription identity module (eSIM) profile is not installed on the wearable device, display, via the touchscreen display, a user interface (UI) to install the eSIM profile on the wearable device, the UI including one or more contract options associated with a cellular network service for the wearable device; receive, via the touchscreen display, a user input to select at least one contract option from the one or more contract options; and transmit, using the second communication circuitry, a service subscription request corresponding to the at least one contract option to a first server associated with the cellular network service, such that the eSIM profile corresponding to the at least one contract option is installed on the wearable device based at least in part on the service subscription request.

In accordance with another aspect of the present disclosure, a method for operating a portable electronic device is provided. The method includes establishing, using a first communication circuitry, a short-range communication connection with a wearable device based at least in part on a graphical code being displayed on a display of the wearable device; based at least in part on a determination that an eSIM profile is not installed on the wearable device, displaying, via a touchscreen display of the portable communication device, a UI to install the eSIM profile on the wearable device, the UI including one or more contract options associated with a cellular network service for the wearable device; receiving, via the touchscreen display, a user input to select at least one contract option from the one or more contract options; and transmitting, using a second communication circuitry to establish a cellular communication connection, a service subscription request corresponding to the at least one contract option to a first server associated with the cellular network service, such that the eSIM profile corresponding to the at least one contract option is installed on the wearable device based at least in part on the service subscription request.

BRIEF DESCRIPTION OF THE DRAWINGS

The above and other aspects, features, and advantages of embodiments of the present invention will be more apparent from the following description when taken in conjunction with the accompanying drawings, in which.

DETAILED DESCRIPTION

Figure 1:
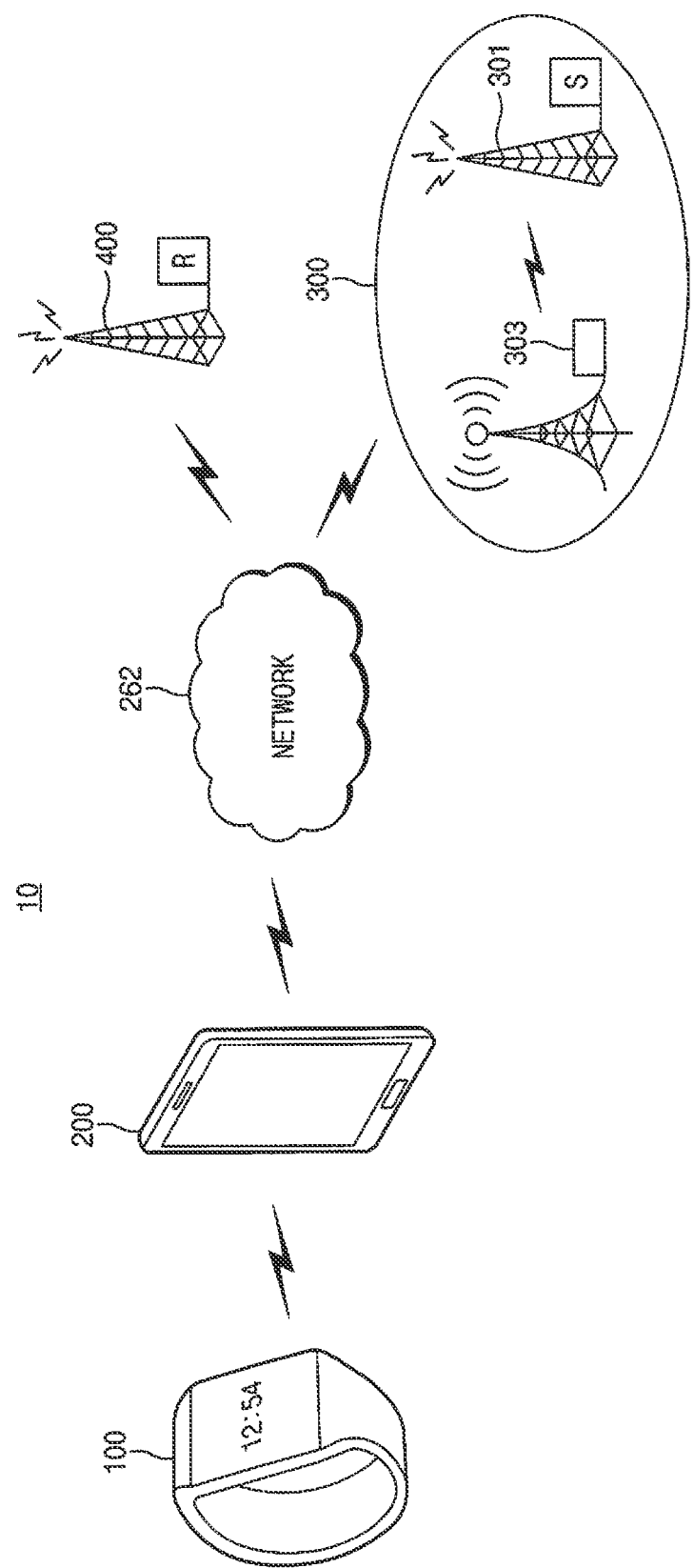
FIG. 1 is a diagram illustrating a communication profile operating environment according to various embodiments of the present disclosure.

Hereinafter, various embodiments of the present disclosure are described in detail with reference to the accompanying drawings. However, the present disclosure is not limited to specific embodiments described herein, but rather includes various modifications, equivalents and/or alternatives of various embodiments of the present disclosure. Regarding description of the drawings, the same or similar reference numerals may refer to the same or similar elements.

The terms "have", "may have", "include", "may include" or "comprise", as used herein, indicate the existence of a corresponding feature (e.g., a number, a function, an operation, or an element) but do not exclude the existence of an additional feature.

Herein, the terms "A or B", "at least one of A and/or B", or "one or more of A and/or B" include all possible combinations of the items listed together. For example, the term "A or B", "at least one of A and B", or "at least one of A or B" include the cases of (1) including at least one A, (2) including at least one B, and (3) including at least one A and at least one B.

The terms "first", "second", or the like are used herein to modify various elements regardless of order and/or priority, but do not limit the elements. For example, "a first user device" and "a second user device" may indicate different user devices regardless of order or priority. For example, without departing the scope of the present disclosure, a first element may be referred to as a second element and vice versa.

When a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the terms, for example, "suitable for", "having the capacity to", "designed to", "adapted to", "made to", or "capable of". The term "configured (or set) to" may not necessarily have the meaning of "specifically designed to". In some cases, the term "device configured to" perform a function indicates that the device may perform the function alone or together with other devices or components. For example, the term "processor configured (or set) to perform A, B, and C" represents a dedicated processor (e.g., an embedded processor) for performing a corresponding operation, or a generic-purpose processor (e.g., a CPU or an application processor) for executing at least one software program stored in a memory device to perform a corresponding operation.

The terminology used herein does not limit the present disclosure but is merely used for describing specific various embodiments. The terms of a singular form include plural forms unless otherwise specified. The terms used herein, including technical or scientific terms, may have the same meanings as understood by those skilled in the art. Commonly-used terms defined in a dictionary are to be interpreted as having definitions that are the same as or similar to contextual meanings defined in the related art, and should not be interpreted in an idealized or overly formal sense unless otherwise defined explicitly. In certain cases, even the terms defined herein should not be interpreted in a manner that excludes various embodiments of the present disclosure.

Hereinafter, an electronic device according to various embodiments of the present disclosure is described with reference to the accompanying drawings. The term "user" used herein refers to a person who uses an electronic device or may refer to a device (e.g., an artificial intelligence electronic device) that uses an electronic device.

FIG. 1 is a diagram illustrating a communication profile operating environment according to various embodiments of the present disclosure.

Referring to FIG. 1, a communication profile operating environment 10 includes a first electronic device 100, a second electronic device 200, a network 262, a server device 300, and a service device 400.

In the communication profile operating environment 10, the first electronic device 100 sends a request to the server device 300 to support communication service subscription, using at least one of a communication function or a UI (e.g., a screen UI, a voice UI, a touch UI, a gesture UI, or the like) of the second electronic device 200. As described above, the communication profile operating environment 10 supports the first electronic device 100, which has limited communication functions and/or a limited screen UI, so that the first electronic device 100 is able to obtain a communication profile from the server device 300 using at least one of the communication function or the screen UI of the second electronic device 200. In this operation, the server device 300 generates a communication profile (e.g., an MNO profile) on the basis of provisioning-related information and transfers the generated communication profile to the first electronic device 100. The first electronic device 100 performs registration with the service device 400 and performs communication service operations using the received communication profile. Although, in the example according to FIG. 1, that the first electronic device 100 receives the communication profile via the second electronic device 200, various embodiments of the present disclosure are not limited thereto. For example, the first electronic device 100 may only use the screen UI of the second electronic device 200, and the electronic device 100 may directly access the server device 300 regarding the communication function. Alternatively, the first electronic device 100 may only use the communication function of the second electronic device 200, and may not use the screen UI thereof.

The first electronic device 100 includes a first communication module for communicating with the second electronic device 200 and a second communication module for using a communication service based on a base station. The first electronic device 100 discovers the second electronic device 200 and may establish a communication channel thereto according to a user input or a set schedule, and performs acquisition of a communication profile using at least one of the communication function or the screen UI of the second electronic device 200. Here, the first electronic device 100 may store a provisioning profile for enabling access to the server device 300 in advance. Alternatively, the first electronic device 100 may perform a procedure for obtaining the communication profile via the second electronic device 200, without the provisioning profile. The provisioning profile includes information required for the first electronic device 100 to access the server device 300 before obtaining the communication profile. The first electronic device 100 may provide, to the second electronic device 200, provisioning-related information including address information and device information of the first electronic device 100 (e.g., an subscription manager secure routing (SM-SR) identifier (ID) (SRID), an embedded universal integrated circuit card (eUICC) ID (EID), an international mobile equipment identify (IMEI), device location information, device manufacturer information, or the like).

The first electronic device 100 may be, for example, a wearable-type electronic device (e.g., a watch-type, wrist wearable-type, necklace-type, belt-type, or head-mounted-type device). Alternatively, the first electronic device 100 may be a machine-to-machine (M2M) device limited in terms of screen UI. The first electronic device 100 may have a large screen. The first electronic device 100 may be a companion device of the second electronic device 200.

The first electronic device 100 may be in a provisioning performing state related to installation (or download) of a communication profile or a normal function performing state for performing a user function (e.g., a file playback function, a file search function, or the like) supportable by the first electronic device 100. According to various embodiments of the present disclosure, when being turned on or operating a provisioning manager, the first electronic device 100 may check whether a communication profile that is available for a current location is installed within an embedded universal integrated circuit card (eUICC), a secure element, an eSIM, or the like of the first electronic device 100, and may determine which one of a provisioning procedure and a generation function performing procedure the first electronic device 100 should operate, according to whether the communication profile is present.

If there is no communication profile available for the current location, the first electronic device 100 may perform a provisioning procedure for downloading and installing the communication profile in order to receive a network service. Here, the first electronic device 100 may determine whether provisioning support through the second electronic device 200 is required. If the provisioning through the second electronic device 200 is required, the first electronic device 100 may output a provisioning-related UI. In outputting the provisioning-related UI, the first electronic device 100 may provide a menu for allowing a user to trigger connection to the external electronic device through short-range communications supported by the first electronic device 100, or may output a specified image or specified code information for performing the provisioning procedure.

If there is a communication profile available for the current location, the first electronic device 100 performs a normal corresponding function (e.g., a communication service based on a base station, a file playback function, an imaging function, or the like) supported by the first electronic device 100. When performing the normal function, the first electronic device 100 may register one or more communication profiles, from among one or more available communication profiles, in a service device, based on a user configuration and current location information of the first electronic device 100.

The second electronic device 200 may store a communication profile in advance (i.e., before receiving a request for a profile from the first electronic device 100). Accordingly, the second electronic device 200 may be able to access the server device 300 and the service device 400. The second electronic device 200 includes a third communication module for establishing a communication channel to the first electronic device 100 and a fourth communication module for a connection to the server device 300 or the service device 400. When connected to the first electronic device 100, the second electronic device 200 supports at least one of a screen UI or a communication function related to acquisition of a communication profile by the first electronic device 100 according to a request of the first electronic device 100 or a user input to or a characteristic of the first electronic device 100. The second electronic device 200 may be, for example, a portable terminal device or a smartphone.

The second electronic device 200 handles a provisioning support function (or a provisioning support mode) related to the provisioning procedure of the first electronic device 100. For example, the second electronic device 200 receives a provisioning support request message from an external electronic device (e.g., the first electronic device 100) regardless of whether an eSIM or an eUICC is installed. Upon receiving the provisioning support request message, the second electronic device 200 activates the provisioning support function (or switch into the provisioning support mode) for supporting provisioning of the first electronic device 100. As the provisioning support function is activated, the second electronic device 200 provides a provisioning support screen related to execution and subscription of a specific application or access to a specific webpage using an accessible network, while performing the provisioning support function related to the first electronic device 100.

According to an embodiment of the present disclosure, the second electronic device 200 transfers, to a network, information of the second electronic device 200 (e.g., provider information, a phone number for receiving a short message service (SMS) message, information on a service being used, a rate payment system, a device location, or the like) together with the provisioning-related information received from the first electronic device 100 according to a situation. In this manner, the second electronic device 200 provides, to a user, a SIM profile subscription procedure and provisioning procedure of the first electronic device 100 and a service subscription procedure associated with the second electronic device 200.

As the provisioning support function is activated, the second electronic device 200 may receive, from a provisioning server device 303, a message (e.g., an SMS type-2 message or an SMS-point-to-point (PP) data download) for establishing a secure channel. According to an embodiment of the present disclosure, a control module (or a provisioning manager module) of the second electronic device 200 transfers a message received by the control module to the first electronic device 100 without transferring the message to a UICC (or an eUICC) of the control module. In this manner, the second electronic device 200 establishes a secure channel between the provisioning server device 303 and the first electronic device 100 that is performing the provisioning function. The second electronic device 200 allows a corresponding communication profile to be safely downloaded to the first electronic device 100 (or an eUICC 150) through the established secure channel.

Upon receiving a provisioning completion message (e.g., a provisioning support mode inactivation request message) from the first electronic device 100, which performs provisioning, the second electronic device 200 which performs the provisioning support function may organize provisioning-support-related context that has been being managed internally and may inactivate the provisioning support function. Here, the deactivation of the provisioning support function may be performed in response to a request from the first electronic device 100, a request from the provisioning server device 303, or expiration of a timer in the control module. If a message (e.g., a message for establishing a secure channel (e.g., SMS type-2 or SMS-PP data download)) is received while the provisioning support function is inactivated, the second electronic device 200 does not transfer the message to the first electronic device 100, but instead transfers the message to a UICC (e.g., the UICC or eUICC of the second electronic device 200) so that the message is processed. According to various embodiments of the present disclosure, the second electronic device 200 supports execution of other various electronic device functions such as a file playback function, a file search function, a voice search function, a call function, or the like, while performing the provisioning support function for the first electronic device 100.

The network 262 supports establishment of a communication channel between the first electronic device 100 and the server device 300. Furthermore, the network 262 may support establishment of a communication channel between the second electronic device 200 and the server device 300. The network 262 may correspond to a network resource element for supporting establishment of a communication channel between the first electronic device 100 and the service device 400. To this end, the network 262 may include at least one communication module for supporting various communication methods.

The server device 300 supports communication service subscription of the first electronic device 100. For example, the server device 300 may provide, to the first electronic device 100 or the second electronic device 200 connected thereto, subscription support information about selection of a rate payment system desired by the user of the first electronic device 100, selection of an option, selection of a data amount, and selection of a service associated with another electronic device. The server device 300 includes, for example, a subscription support server device 301 for providing subscription support information and collecting subscription request information corresponding thereto and the provisioning server device 303 for generating and providing a communication profile. The subscription support server device 301 may receive provisioning-related information of the first electronic device 100 via the second electronic device 200, or may receive the provisioning-related information from the first electronic device 100. Here, the provisioning-related information may include information on access to the server device 300, unique identification information such as an eUICC ID or unique identification information of the first electronic device 100. Additionally or alternatively, the subscription support server device 301 may receive identification information or communication service subscription information of the second electronic device 200 together with the provisioning-related information.

The service device 400 provides a base-station-based communication service to the first electronic device 100 in which a communication profile is installed. For example, the service device 400 may be a device of a service provider that provides a communication service.

Figure 2:
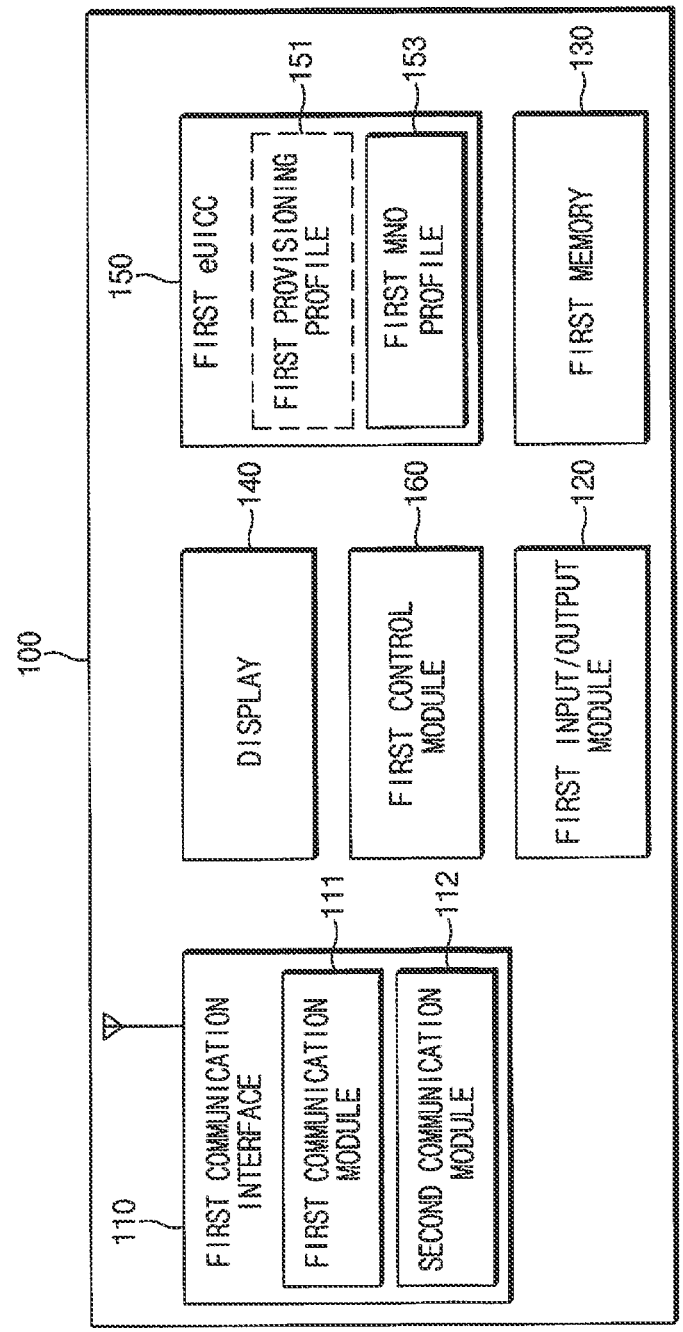
FIG. 2 is a diagram illustrating a configuration of a first electronic device according to various embodiments of the present disclosure.

FIG. 2 is a diagram illustrating a configuration of a first electronic device according to various embodiments of the present disclosure.

Referring to FIG. 2, the first electronic device 100 includes a first communication interface 110, a first input/output module 120, a first memory 130, a display 140, a first eUICC (or a first secure element) 150, and a first control module 160.

The first communication interface 110 supports a communication function of the first electronic device 100. For example, the first communication interface 110 establishes at least one of a communication channel to the second electronic device 200, a communication channel to the server device 300, and a communication channel to the service device 400. According to an embodiment of the present disclosure, if a provisioning profile is stored, the first communication interface 110 may establish communication channels to the second electronic device 200 and the server device 300. If the provisioning profile does not exist, the first communication interface 110 establishes a communication channel to the second electronic device 200. In relation to the above-mentioned communication channel establishment, the first communication interface 110 includes a first communication module 111 and a second communication module 112.

The first communication module 111 establishes a communication channel to the second electronic device 200. For example, the first communication module 111 may establish a short-range communication channel to the second electronic device 200, while being adjacent to the second electronic device 200. The first communication module 111 may include, for example, a Bluetooth communication module, a Wi-Fi direct communication module, a radio frequency identification (RFID) communication module, a ZigBee communication module, or the like. The first communication module 111 may also include a wired communication module for performing a wired connection to the second electronic device 200.

The second communication module 112 establishes a communication channel to the service device 400 using a base station. The second communication module 112 establishes a communication channel to the server device 300 using a base station. According to an embodiment of the present disclosure, when a communication profile is installed in the first electronic device 100, the second communication module 112 establishes a communication channel to the service device 400, which is capable of providing a call service, through a mobile communication network or through an Internet network. For example, the second communication module 112 may support various cellular communication methods such as 3G/4G, long term evolution (LTE), or the like. In relation to operation of the second communication module 112, a communication profile may be required. When the communication profile is not installed in the first electronic device 100, but a provisioning profile is installed, the second communication module 112 may access the server device 300 alone.

The first memory 130 includes at least one of an operating system, a program, or data related to support of a function of the first electronic device 100. The first memory 130 stores data related to a provisioning screen interface provided in a provisioning state.

The display 140 outputs various screens related to operation of the first electronic device 100. For example, the display 140 outputs a standby screen, a home screen, a specific function execution screen, a lock screen or the like of the first electronic device 100. According to an embodiment of the present disclosure, the display 140 outputs a provisioning UI. The provisioning UI may include, for example, information indicating whether a provisioning profile is stored or is activated or whether a communication profile is installed or is activated. Furthermore, the provisioning UI may include an icon or a menu item for performing provisioning. According to various embodiments of the present disclosure, the provisioning UI may output code information (e.g., a barcode, a quick response (QR) code, or the like) including provisioning-related information.

The display 140 may have a limited output environment according to the type of the first electronic device 100. For example, when the first electronic device 100 is a wearable device, the display 140 may only output a text or an image having up to a specified maximum size. Therefore, a part of the provisioning UI may output to the display 140, and the other part of the provisioning UI may be output through the second electronic device 200. Alternatively, according to various embodiments of the present disclosure, when the first electronic device 100 is a note-type or pad-type device, the display 140 may have a size at least equal to a size of a screen of the second electronic device 200.

The first eUICC 150 is an area where profiles related to communication service operation of the first electronic device 100 are stored. For example, the first eUICC 150 stores a first provisioning profile 151. The provisioning profile 151 is used to receive a communication profile, for example, a first mobile network operator (MNO) profile 153. The first provisioning profile 151 (or a storage area in the first eUICC 150 or the first control module 160) includes address information on the server device 300 to be accessed for performing registration related to use of a communication service or address information on the subscription support server device 301. Furthermore, the first eUICC 150 includes unique identification information (e.g., eUICC ID (EID)). The first MNO profile 153 is a communication profile that may be obtained from the server device 300 using the first provisioning profile 151. The first electronic device 100 accesses the service device 400 using the first MNO profile 153. According to various embodiments of the present disclosure, the first eUICC 150 may not be equipped with the first provisioning profile 151.

The first control module 160 processes and transfers data related to communication profile operation of the first electronic device 100, and processes a function related to the subscription support server device 301. For example, the first control module 160 may check whether a communication profile is stored in the first electronic device 100, during a booting process or the booting process is completed after power supply is performed. Alternatively, the first control module 160 may check whether the communication profile is stored in the first electronic device 100 when requesting a communication service using the second communication module 112.

When the communication profile is not stored in the first electronic device 100 or downloading of a new communication profile is requested, the first control module 160 checks whether the first provisioning profile 151 exists in the first eUICC 150. The first control module 160 performs control so that the first MNO profile 153 is downloaded using the first provisioning profile 151. In controlling download of the first MNO profile 153, the first control module 160 may use at least one of the screen UI or the communication function of the second electronic device 200. When neither the communication profile nor the first provisioning profile 151 is stored in the first electronic device 100, the first control module 160 performs a provisioning procedure related to communication profile installation using the communication function of the second electronic device 200.

According to various embodiments of the present disclosure, an electronic device according to an embodiment of the present disclosure may include a first communication module for establishing a communication channel to an adjacent external electronic device, a second communication module for supporting a communication service based on a base station, and a control module for performing control so as to obtain a communication profile required for operating the second communication module that supports the communication service based on the base station using the external electronic device connected through the first communication module.

According to various embodiments of the present disclosure, an electronic device according to an embodiment of the present disclosure may include a memory for storing information related to communication service operation and a processor connected to the memory, wherein the processor may establish a communication channel to an external electronic device adjacent to the electronic device, and may collect a communication profile required for operating a communication service based on a base station through the external electronic device.

As described above, according to various embodiments of the present disclosure, an electronic device (e.g., a first electronic device) according to an embodiment of the present disclosure may include a first communication module for establishing a communication channel to an external electronic device on the basis of wired communications or short-range communications, a control module for performing control so as to obtain a communication profile required for operating a second communication module that supports a communication service based on a base station using the external electronic device connected through the first communication module, and a memory such as a secure storage area or an eUICC for storing the communication profile obtained.

According to various embodiments of the present disclosure, the control module may output (or display), through the external electronic device, at least a portion of subscription support information required for obtaining the communication profile.

According to various embodiments of the present disclosure, the control module may receive the subscription support information and transfer the subscription support information to the external electronic device, or may allow the external electronic device to receive and output the subscription support information.

According to various embodiments of the present disclosure, the control module may receive selection information on a service contract option or a communication profile selected from the subscription support information received from the external electronic device.

According to various embodiments of the present disclosure, the control module may perform control so that subscription request information corresponding to the selection information is transmitted to a subscription support server device that has provided the subscription support information.

According to various embodiments of the present disclosure, the control module may perform control so that provisioning-related information is transmitted to the subscription support device on the basis of a provisioning profile stored in relation to access to the subscription support server device that supports subscription for the communication service based on the base station.

According to various embodiments of the present disclosure, the control module may perform control so that the provisioning-related information is transmitted to the subscription support server device via the external electronic device.

According to various embodiments of the present disclosure, the control module may perform control so that at least one of information on existence of a provisioning profile related to access to the subscription support server device that supports subscription for the communication service based on the base station and information on whether the communication profile is stored is output.

According to various embodiments of the present disclosure, the control module may perform control so that a specified normal UI is output if the provisioning profile exists, or a specified provisioning UI related to proceeding with a provisioning procedure is output if the provisioning profile does not exist.

According to various embodiments of the present disclosure, the control module may perform control so that a specified image or specified code information corresponding to the provisioning-related information for proceeding with the provisioning procedure is output if the provisioning profile exists.

According to various embodiments of the present disclosure, an electronic device according to an embodiment of the present disclosure may include a communication module for establishing a communication channel to a peripheral device on the basis of wired communications or short-range communications and a control module for checking whether a communication profile for operating a communication service of the peripheral device is stored, wherein, if the communication profile does not exist, the control module may activate a provisioning support function of the peripheral device and may control an operation related to installation of the communication profile of the peripheral device.

According to various embodiments of the present disclosure, the control module may perform control so that information on whether at least one of the communication profile or a provisioning profile used for installing the communication profile is stored is output.

According to various embodiments of the present disclosure, the control module may perform control so that a UI required for obtaining the communication profile of the peripheral device is output.

According to various embodiments of the present disclosure, the control module may receive information related to the communication profile from the peripheral device to output the information, or may receive the information related to the communication profile from a server device for supporting the communication service to process the information.

According to various embodiments of the present disclosure, the control module may perform control so as to transmit, to the peripheral device, communication service selection information selected from a UI corresponding to the information related to the communication profile in response to a user input.

According to various embodiments of the present disclosure, the control module may perform control so as to transmit the communication service selection information to the server device for supporting subscription for the communication service.

According to various embodiments of the present disclosure, the control module may perform control so as to transmit provisioning-related information of the peripheral device to a subscription support server device for supporting communication service subscription, using a communication module for using a communication service based on a base station.

According to various embodiments of the present disclosure, the control module may perform control so that a message received from a provisioning server device for generating or providing the communication profile is transferred to the peripheral device.

According to various embodiments of the present disclosure, the control module may perform control so that the message received is converted into a format supported by a communication standard used for a connection to the peripheral device, and then is transferred thereto.

According to various embodiments of the present disclosure, the control module may perform control so that the communication profile is received from the provisioning server device and is transferred to the peripheral device.

According to various embodiments of the present disclosure, the control module may perform control so that a Bluetooth (BT) subscriber identification module (SIM) access profile (AP) (BT SAP) connection to the peripheral device is established.

According to various embodiments of the present disclosure, the control module may control operation of a second UICC manager related to installation of the communication profile of the peripheral device, while operating a first UICC manager for operating a communication service of the control module.

According to various embodiments of the present disclosure, the second UICC manager may support establishment of a secure channel between the peripheral device and a server device that supports installation of the communication profile, using a transmission control protocol (TCP)-based communication channel to the server device and a subscriber identification module access profile (SAP)-based communication channel to the peripheral device.

According to various embodiments of the present disclosure, the second UICC manager may receive application protocol data unit (PDU) (APDU) data from the peripheral device and may transmit the APDU data to the server device.

According to various embodiments of the present disclosure, a resource for the second UICC manager may be returned when downloading of data related to the communication profile is completed or the communication profile is activated.

Figure 3:
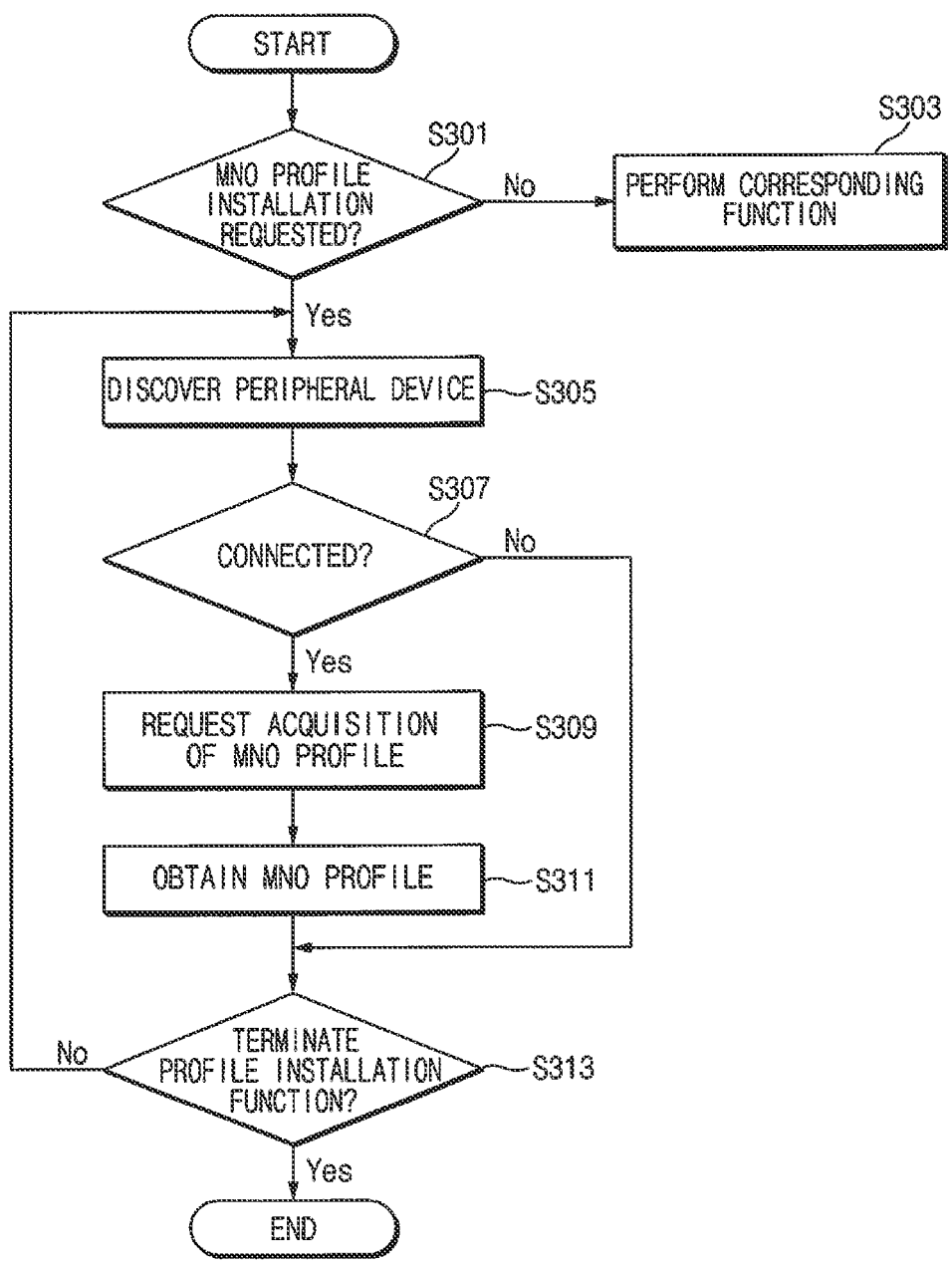
FIG. 3 is a flowchart illustrating a method for operating a first electronic device in relation to a communication profile according to various embodiments of the present disclosure.

FIG. 3 is a flowchart illustrating a method for operating a first electronic device in relation to a communication profile according to various embodiments of the present disclosure Referring to FIG. 3, when an event occurs, the first electronic device 100 determines whether the event is related to a request for installation of a communication profile (e.g., the first MNO profile 153) in step S301. If the event is not related to installation of the first MNO profile 153, the first electronic device 100 may perform a function according to the type of the event in step S303. For example, according to the type of the event, the first electronic device 100 may execute an application that supports a healthcare function or may support playback of a stored file. In step S303, when the communication profile is not installed, the first electronic device 100 may output a screen UI related to a request for downloading the first MNO profile 153.

If the event is related to a request for installation of the first MNO profile 153, the first electronic device 100 searches for a peripheral device (e.g., the second electronic device 200) in step S305. For example, the first electronic device 100 performs a Bluetooth scanning operation. The first electronic device 100 outputs, to the display 140, peripheral device information obtained through the scanning operation. Alternatively, if a peripheral device that has been most recently connected or a peripheral device that has not been connected is discovered, the first electronic device 100 may attempt to establish a communication channel to the peripheral device on the basis of the first communication module 111. Alternatively, the first electronic device 100 may output a peripheral device list, and may attempt to establish a communication channel to a peripheral device selected by a user on the basis of the first communication module 111.

In step S307, the first electronic device 100 checks whether the first electronic device 100 is connected to the peripheral device. For example, the first electronic device 100 may check whether a communication channel to the peripheral device (e.g., the second electronic device 200) is established through the first communication module 111. If there is no connection to the peripheral device or connection thereto fails, steps S309 and S311 are skipped, and the process proceeds to step S313.

If the peripheral device is connected, in step S309, the first electronic device 100 sends a request the peripheral device to provide an MNO profile (e.g., the communication profile or the first MNO profile 153). In relation to step S309, the first electronic device 100 may provide, to the peripheral device, the provisioning-related information stored in the first provisioning profile 151. In response to a provisioning performance request from the first electronic device 100, the peripheral device may establish a communication channel to the server device 300 and requests subscription support information on the basis of the provisioning-related information. In step S309, the peripheral device may transmit, to the server device 300, a message including information indicating that an operation entity of the communication profile is the first electronic device 100.

The server device 300 may generate, on the basis of the provisioning-related information, the communication profile to be operated in the first electronic device 100. For example, the subscription support server device 301 may transfer, to the peripheral device, the subscription support information related to generation of the communication profile. Upon receiving subscription request information (e.g., information indicating a selection of an option from the subscription support information or communication profile type selection information) from the peripheral device, the subscription support server device 301 provides the provisioning-related information and the subscription request information to the provisioning server device 303. The provisioning sever device 303 generates, on the basis of the received pieces of information, the communication profile to be operated in the first electronic device 100, and transfers the communication profile to the first electronic device 100. In step S311, the provisioning server device 303 may transfer the communication profile to the first electronic device 100 via the peripheral device (e.g., the second electronic device).

Accordingly, in step S311, the first electronic device 100 obtains an MNO profile for using the service device 400. The first electronic device 100 stores the MNO profile (e.g., the first MNO profile 153 or the communication profile) in the first eUICC 150. The first electronic device 100 may support a communication service through access to the service device 400 on the basis of the MNO profile stored in the first eUICC 150.

In step S313, the first electronic device 100 determines whether an event related to termination of a profile installation function occurs. If an event related to termination of the profile installation function occurs, the first electronic device 100 terminates the profile installation function. For example, when the first electronic device 100 is not connected to the peripheral device, the process returns to step S305 so that the first electronic device 100 may re-perform step S305 and the following operations. Alternatively, after the communication profile is installed, the process may return to step S301 according to a user input so that the first electronic device 100 may re-perform step S301 and the following operations. In this manner, the first electronic device 100 obtains a plurality of communication profiles.

As described above, the first electronic device 100 may install a communication profile using the peripheral device. For example, when the first electronic device 100 is a watch-type wearable device, the first electronic device 100 may operate the first control module (e.g., an eSIM service manager module) when being supplied with power, so as to determine whether provisioning is required on the basis of whether a communication profile (e.g., an MNO profile) that is available for a current location is installed in an eUICC. If it is determined that the provisioning is required, the first control module (e.g., an eSIM service manager module) of the first electronic device 100 may provide a provisioning UI, and may perform connection preparation (e.g., turning on Wi-Fi, NFC, BT, or the like with respect to the first communication module 1). Furthermore, the first electronic device 100 may connect to the second electronic device 200, according to a user's selection.

According to various embodiments of the present disclosure, if there already is communication profile that is available already exists or the provisioning through the peripheral device is completed, the first control module 160 (e.g., an eSIM service manger module) of the first electronic device 100 may provide a UI related to execution of a normal function (e.g., a UI or the like including communication-service-related icons, set information, or icons related to execution of specific applications) instead of the provisioning UI. In this operation, the first electronic device 100 may support a communication service via the service device 400 using the second communication module 112 and the installed communication profile.

Figure 4:
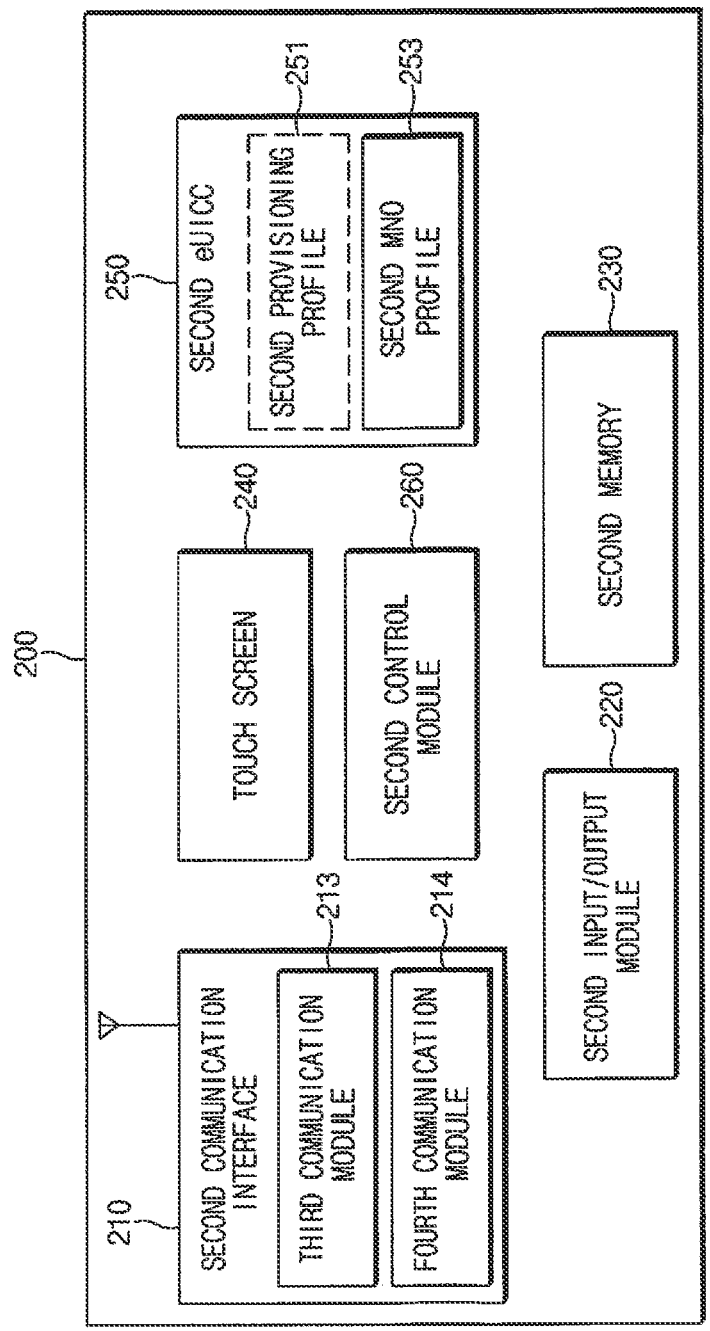
FIG. 4 is a diagram illustrating a configuration of a second electronic device according to various embodiments of the present disclosure.

FIG. 4 is a diagram illustrating a configuration of a second electronic device according to various embodiments of the present disclosure.

Referring to FIG. 4, the second electronic device 200 includes a second communication interface 210, a second input/output module 220, a second memory 230, a touch screen 240, a second eUICC (or a second secure element) 250, and a second control module 260. Additionally or alternatively, the second electronic device 200 may include a SIM slot and a SIM card inserted thereinto, instead of the second eUICC. Embodiments of the present disclosure are not limited to the above-described configuration of the second electronic device 200, but may have any structure enabling access to the subscription support server device 301.

The second communication interface 210 supports a communication function of the second electronic device 200. For example, the second communication interface 210 may establish a communication channel to the first electronic device 100, the server device 300, and/or the service device 400. The second communication interface 210 includes a third communication module 213 and a fourth communication module 214.

The third communication module 213 establishes a communication channel to the first electronic device 100. For example, the third communication module 213 supports a communication standard compatible with the first communication module 111. According to an embodiment of the present disclosure, the third communication module 213 may be a wired communication module or a short-range wireless communication module. For example, the third communication module 213 may be a Bluetooth communication module, a Wi-Fi communication module, or the like. The third communication module 213 receives a provisioning support request message from the first electronic device 100 through a communication channel to the first electronic device 100. In response to completion of provisioning, the third communication module 213 transfers a communication profile to the first electronic device 100. Alternatively, in relation to provisioning, the third communication module 213 transfers, to the first electronic device 100, a specific-type message (For example, type2 SMS message) provided by the server device 300.

The fourth communication module 214 establishes a communication channel to the server device 300 or a communication channel to the service device 400. The fourth communication module 214 may support a base-station-based communication service such as a 3G/4G or LTE communication service. According to an embodiment of the present disclosure, the fourth communication module 214 receives various types of short messages.

The second input/output module 220 supports an input function or an audio output function related to operation of the second electronic device 200. For example, the second input/output module 220 may include a key input unit such as a volume control key button, a home button, a power button, or the like. According to an embodiment of the present disclosure, the second input/output module 220 generates, according to a user input, an input signal for activating the third communication module 213, an input signal for issuing instructions to establish a communication channel to the first electronic device 100, or an input signal related to entry into or release of a provisioning support state. Furthermore, the second input/output module 220 may generate, according to a user input, an input signal for selecting a specific item from a subscription support screen provided by the server device 300.

The second memory 230 stores various data, at least one program, or an operating system related to operation of the second electronic device 200. The second memory 230 may include, for example, external electronic device discovery information. The external electronic device discovery information may include, for example, information indicating whether a communication profile of a discovered external electronic device (e.g., the first electronic device 100) is stored in the second electronic device 200. Furthermore, the second memory 230 may include, for example, screen interface information for supporting provisioning of the first electronic device 100.

The touch screen 240 outputs various screens related to operation of the second electronic device 200. For example, the touch screen 240 may output a standby screen, a home screen, or the like. Furthermore, the touch screen 240 may output a screen corresponding to peripheral scanning by the third communication module 213, output a screen displaying a list of discovered external electronic devices, or output a screen displaying information corresponding to a state of a connection based on the third communication module 213. Furthermore, the touch screen 240 may output a screen related to reception of a provisioning support request message from the first electronic device 100. Furthermore, the touch screen 240 may output a screen for a state where the server device 300 is accessed, a subscription support screen, or the like. The touch screen 240 includes a display panel for displaying a screen and a touch panel for receiving an input. The touch screen 240 may have a larger screen size than a screen size of the display 140 of the first electronic device 100 (e.g., when the first electronic device 100 is a wearable electronic device) or smaller than that of the display 140 of the first electronic device 100 (e.g., when the first electronic device 100 is an electronic note-type device or an electronic pad-type device).

The second eUICC 250 stores a profile related to communication service operation of the second electronic device 200. For example, the second eUICC 250 stores a second provisioning profile 251 and a second MNO profile 253. The second provisioning profile 251 is related to installation of a communication profile of another communication service provider that supports a communication service in another area where the second electronic device 200 is not currently positioned. The second provisioning profile 251 may not be stored in the second eUICC 250 according to design of the second electronic device 200 or a service subscribed for. The second MNO profile 253 is required to access the server device 300 or the service device 400 at a current location.

According to various embodiments of the present disclosure, the second eUICC 250 may not be equipped with the second provisioning profile 251.

The second control module 260 processes or transfers data or signals related to operation of the second electronic device 200. For example, the second control module 260 may perform a function of discovering the first electronic device 100 or a function of processing a provisioning support request received from the first electronic device 100 while being connected thereto. Furthermore, the second control module 260 may handle transfer of the provisioning-related information of the first electronic device 100 received during a provisioning support request process, output of a subscription support screen, or transfer of subscription request information.

Furthermore, the second control module 260 provides specific subscription request information associated with the first and second electronic devices 100 and 200 to the server device 300 according to a user input. The specific subscription request information may include, for example, information indicating a selection of a forwarding switching service for each situation or a combined rate payment system or discounted rate payment system for the first and second electronic devices 100 and 200. The second control module 260 checks device information of the first electronic device 100 connected in relation to provisioning, and supports at least one of a communication function or a screen UI function according to a characteristic of the device information of the first electronic device 100. Here, when the first electronic device 100 is a wearable electronic device, the second control module 260 supports both the communication function and the screen UI function during a provisioning performing process. When the first electronic device 100 is an electronic note device or electronic pad device, the second control module 260 supports communication functions alone during the provisioning performing process.

Figure 5A:
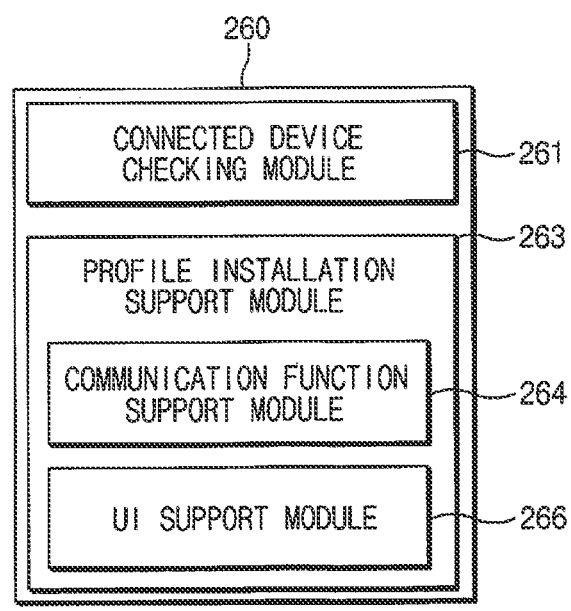
FIG. 5A is a diagram illustrating a second control module according to various embodiments of the present disclosure.

FIG. 5A is a diagram illustrating a second control module according to various embodiments of the present disclosure.

Referring to FIG. 5A, the second control module 260 includes a connected device checking module 261 and a profile installation support module 263.

The connected device checking module 261 activates the third communication module 213 in response to a user input. The connected device checking module 261 performs peripheral scanning using the third communication module 213, and collects information regarding discovered external electronic devices (e.g., the first electronic device 100). In this operation, the connected device checking module 261 outputs a list of the discovered external electronic devices to the touch screen 240. The connected device checking module 261 determines whether a communication profile available for a current location exists in a specified external electronic device (e.g., the first electronic device 100) or an external electronic device satisfying a specific condition (e.g., an electronic device that has been recently connected or has not been connected). To this end, the connected device checking module 261 transmits, to at least one discovered external electronic device, a message for inquiring about existence of a communication profile. The connected device checking module 261 outputs identification information of an external electronic device that does not have a communication profile. If an event in which the identification information is selected occurs, the connected device checking module 261 transfers the identification information to the profile installation support module 263.

The profile installation support module 263 supports installation of a communication profile of an external electronic device (e.g., the first electronic device 100). To this end, the profile installation support module 263 receives, from the connected device checking module 261, identification information of an external electronic device in which a communication profile is not installed. The profile installation support module 263 establishes a communication channel to the first electronic device 100, and may receive provisioning-related information from the first electronic device 100. The profile installation support module 263 determines the accessed server device 300 through the provisioning-related information. The profile installation support module 263 manages provisioning support-related information (e.g., a subscription support server address or policy information) in association with the subscription support server device 301. The profile installation support module 263 updates the provisioning support-related information using the subscription support server device 301. The profile installation support module 263 sends a request to the server device 300 to generate a communication profile for the external electronic device. To this end, the profile installation support module 263 provides, to the server device 300, the identification information of the external electronic device in which the communication profile is to be installed.

If information related to a subscription support screen is received from the server device 300, the profile installation support module 263 outputs the received information. If at least one service item is selected according to a user input, the profile installation support module 263 provides the service item, as subscription request information, to the server device 300. According to various embodiments of the present disclosure, if a service item to be subscribed for in association with an external electronic device and the second electronic device 200 is selected according to a user input, the second electronic device 200 provides, to the server device 300, the identification information of the second electronic device 200 and the identification information of the external electronic device as the subscription request information. If a communication profile is received from the server device 300, the profile installation support module 263 transfers the communication profile to the external electronic device.

The profile installation support module 263 includes a communication function support module 264 and a UI support module 266. If a communication channel to the first electronic device 100 is established, and the first electronic device 100 does not have a communication profile, the communication function support module 264 checks whether a provisioning profile exists in (i.e., is stored in) the first electronic device 100. If the provisioning profile exists, the communication function support module 264 collects provisioning-related information. Thereafter, the communication function support module 264 handles transfer of the provisioning-related information, reception of information related to a subscription support screen, transfer of subscription request information, or transfer of a communication profile. If the provisioning profile does not exist in (i.e., is not stored) in the first electronic device 100, the communication function support module 264 checks whether the second communication module 112 exists. If the second communication module 112 exists, the communication function support module 264 performs access to the server device 300 on the basis of information according to a user input or specified information. Furthermore, the communication function support module 264 may supports transmission/reception of signals related to installation of a communication profile.

If a communication channel to an external electronic device does not have a communication profile is established, the UI support module 266 collects device information of the first electronic device 100. The UI support module 266 checks the device information to determine whether a display characteristic of the external electronic device is less than that of the UI support module 266. For example, the UI support module 266 determines whether a display size of the first electronic device is less than a size of the UI support module 266. If the display characteristic of the external electronic device is lower than that of the UI support module 266, the UI support module 266 may output at least a portion of a provisioning UI and a subscriptions support screen.

As described above, the second control module 260 (e.g., an eSIM service manger module) of the second electronic device 200 determines whether a UI of the second control module should be provided in order to support provisioning of an external electronic device (e.g., a companion device or the first electronic device 100). If it is determined that provision of the UI is required, the second control module 260 executes or downloads a specific application on the basis of information received from the external electronic device. Furthermore, the second control module 260 accesses a specific website, a specific server device, or the like to provide a UI for provisioning. For example, various applications such as respective applications for each of provision of profiles for each of AT&T, TMO (T-Mobile), and Samsung, or the like are installed in the second electronic device 200. If provider information received from the external electronic device indicates AT&T, the second electronic device 200 executes the application for AT&T profile provision to support installation of a communication profile of the external electronic device.

Figure 5B:
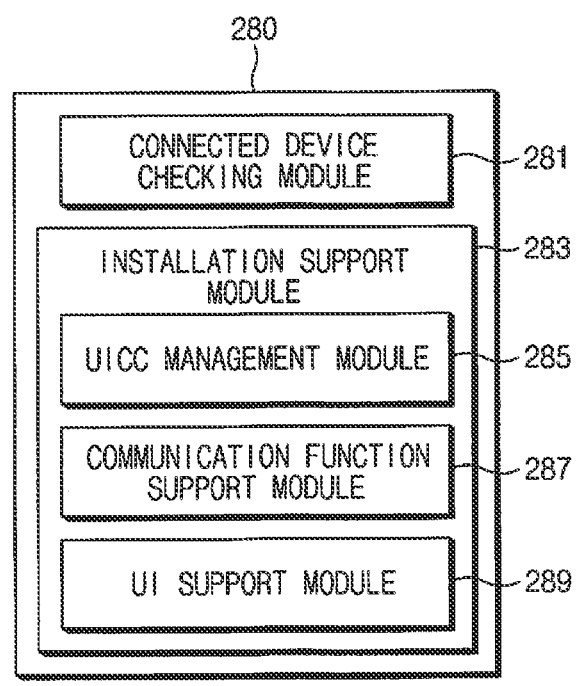
FIG. 5B is a diagram illustrating another example of a second control module according to various embodiments of the present disclosure.

FIG. 5B is a diagram illustrating another example of a second control module according to various embodiments of the present disclosure.

Referring to FIG. 5B, a second control module 280 includes a connected device checking module 281 and an installation support module 283. At least one of the connected device checking module 281 and a UI support module 298 perform operations that are similar to or the same as those of the connected device checking module 261 or the UI support module 266. Therefore, further descriptions of the connected device checking module 281 and the UI support module 289, which overlap with the above descriptions of the connected device checking module 261 and the UI support module 266, are omitted for clarity and conciseness.

According to various embodiments of the present disclosure, the installation support module 283 includes a UICC management module 285, a communication function support module 287, and the UI support module 289.

Like the communication function support module 264, the communication function support module 287 provides a data connection for exchanging data packets with the server device 300. Additionally or alternatively, the communication support function module 287 provides a SIM access profile (SAP) connection of the first electronic device 100 through the third communication module 213 in relation to installation of an MNO profile of the first electronic device 100. Furthermore, the communication function support module 287 establishes a data channel to the server device 300 through the SAP in response to a bearer independent protocol (BIP) connection request from the first eUICC 150 of the first electronic device 100. Accordingly, the communication function support module 287 establishes a communication channel to the server device 300 on the basis of the fourth communication module 214, and is connected to the first electronic device 100 on the basis of the SAP.

If an event related to installation of an MNO profile occurs, the UICC management module 285 sends an SAP connection request to the first electronic device 100 via the communication function support module 287. In relation to sending the SAP connection request, the UICC management module 285 receives an input signal for a request for discovering and connecting the first electronic device 100 from the connected device checking module 281 or a user input. The UICC management module 285 remotely controls the first eUICC 150 of the first electronic device 100 using a SAP connection. For example, if the SAP connection is established, the UICC management module 285 turns on/off or resets the first eUICC 150 as necessary. Furthermore, in relation to generation of the MNO profile, the UICC management module 285 generates an application PDU (APDU) command and transmits the APDU command to the first eUICC 150. For example, the UICC management module 285 transfers an SMS related to generation of the MNO profile to the first eUICC 150, or transfers a hypertext transfer protocol (HTTP) response received from the server device 300 to the first eUICC 150. Furthermore, in response to an APDU request transmitted from the first eUICC 150, the UICC management module 285 sends a request to the communication function support module 287 to establish a communication connection to the server device 300. Alternatively, in response to the APDU request of the first eUICC 150, the UICC management module 285 transmits, to the server device 300, data received from the first eUICC 150. In this manner, the UICC management module 285 controls operation of the first eUICC 150 so that a profile may be installed in the same manner as the manner for installing an eUICC (e.g., the second eUICC 250) included in the second electronic device 200.

As described above, according to various embodiments of the present disclosure, the second electronic device 200 includes a third communication module 213 for establishing a communication channel on the basis of wired communications or short-range communications, and a second control module 260 for determining whether at least one of a communication profile or a provisioning profile related to installation of the communication profile required for communication service operation of a first electronic device 100 connected through the third communication module 213 is stored. In this operation, if the communication profile does not exist, the second control module activates a provisioning support function of the first electronic device 100, and may control an operation related to installation of the communication profile of the external electronic device.

In this operation, the second control module controls so that information indicating whether at least one of the provisioning profile or the communication profile is stored is output.

The second control module 260 performs control so that a screen UI (e.g., subscription support information, or a subscription support screen) required for obtaining the communication profile of the external electronic device is output.

The second control module 260 receives information related to the communication profile (e.g., subscription support information) from the first electronic device 100 to output the information, or receives the information related to the communication profile (e.g., subscription support information) from a server device for supporting the communication service (e.g., a subscription support server device). In receiving the information related to the communication profile, the second control module outputs the information related to the communication profile as specified UT information (e.g., a screen UI, an audio UI, or the like).

The second control module 260 performs control so that communication service selection information corresponding to selection of an item included in the subscription support information is transmitted to the first electronic device 100.

The second control module 260 performs control so as to transmit the communication service selection information to the server device (e.g., a subscription support server device) for supporting subscription for the communication service.

The second control module 260 performs control so that provisioning-related information about the provisioning profile is received from the first electronic device 100, and a subscription support server device that supports subscription for the communication service is accessed using the provisioning-related information received.

The control module 260 performs control so as to transmit the provisioning-related information to a subscription support server device for supporting communication service subscription, using a communication module that supports a base-station-based communication service (e.g., a fourth communication module).

The second control module 260 performs control so that a message received from a provisioning server device for providing the communication profile is transferred to the first electronic device 100.

The second control module 260 performs control so that the message received is converted into a format supported by a communication module connected to the first electronic device 100, and then is transferred thereto.

The second control module 260 performs control so that the communication profile is received from the provisioning server device and is transferred to the first electronic device 100.

The second control module 260 performs control so that additional information (e.g., provider information, a phone number for receiving an SMS message, information on a service being used, a rate payment system, a terminal location, or the like) for requesting a communication service item associated with the first electronic device 100 is added to the provisioning-related information so as to be transmitted to the subscription support server device.

The second control module 260 performs control so that a BT SAP connection to the first electronic device 100 is established.

The second control module 260 controls operation of a second UICC manager related to installation of the communication profile of the first electronic device 100, while operating a first UICC manager for operating a communication service of the second control module.

The second UICC manager supports establishment of a secure channel between the first electronic device 100 and a server device that supports installation of the communication profile, using a TCP-based communication channel to the server device and a SAP-based communication channel to the external electronic device.

The second UICC manager receives APDU data from the first electronic device 100 and transmits the APDU data to the server device.

A resource for the second UICC manager is returned when downloading of data related to the communication profile is completed or the communication profile is activated.

Figure 6:
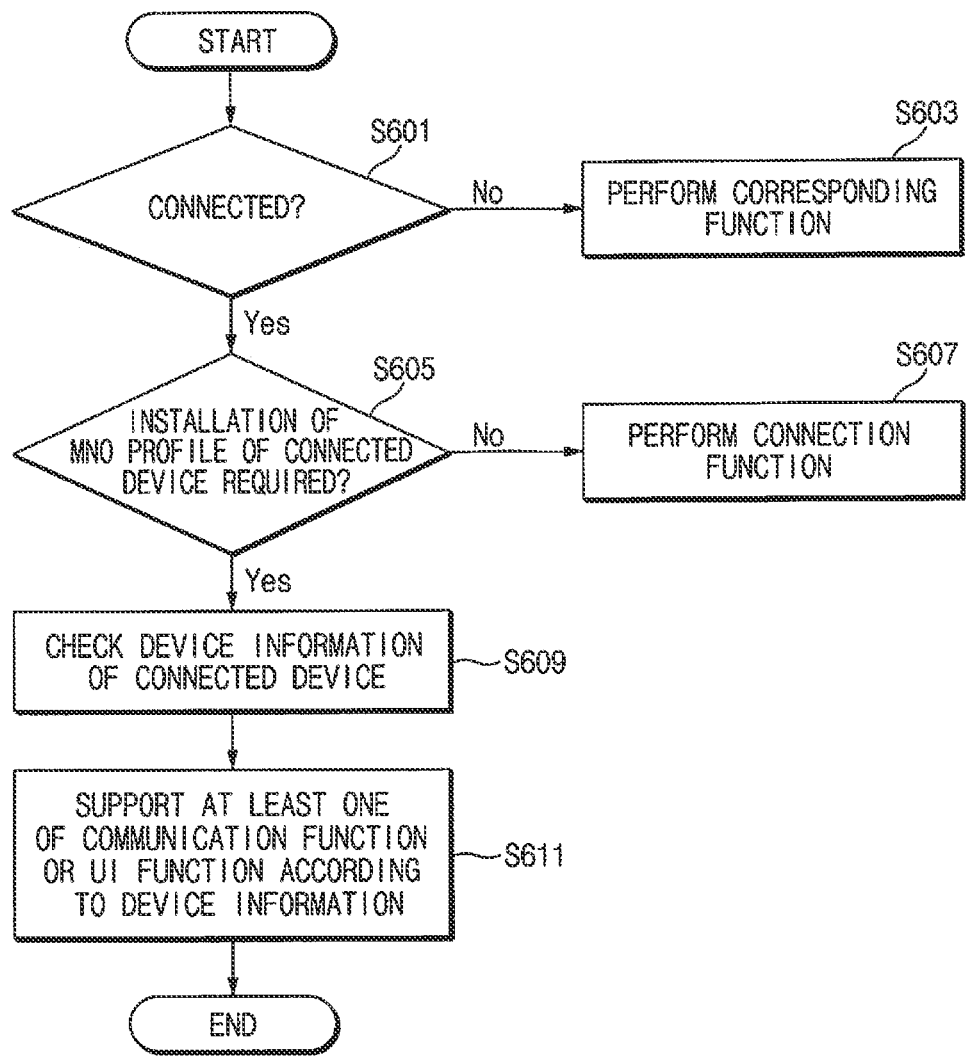
FIG. 6 is a flowchart illustrating a method for operating a second electronic device in relation to a communication profile according to various embodiments of the present disclosure.

FIG. 6 is a flowchart illustrating a method for operating a second electronic device in relation to a communication profile according to various embodiments of the present disclosure.

Referring to FIG. 6, in step S601, the second electronic device 200 determines whether the first electronic device 100 is connected thereto. If the first electronic device 100 is not connected to the second electronic device 200, the second electronic device 200 may support a function according to a user input or a function according to a preset schedule in step S603.

If the first electronic device 100 is connected to the second electronic device 200, the second electronic device 200 determines whether installation of an MNO profile of the connected first electronic device 100 is required in step S605. In relation to determining whether installation of an MNO profile is required, the second electronic device 200 receives, from the first electronic device 100, a request related to installation of the MNO profile (e.g., the communication profile). Alternatively, the second electronic device 200 may send, to the first electronic device 100, a query message for inquiring whether the MNO profile is installed, so as to determine whether installation of the MNO profile is required. If installation of the MNO profile is not required, the second electronic device 200 supports a function for a state in which the first electronic device 100 is connected, in step S607. For example, the second electronic device 200 transfers, to the first electronic device 100, a file, file playback information, or the like received from the outside.

If installation of the MNO profile is required, the second electronic device 200 checks device information of the connected first electronic device 100, in step S609. The device information of the connected first electronic device 100 may include information indicating the type of the connected first electronic device 100. For example, the device information of the connected first electronic device 100 may include information regarding a processor included in the connected device, display information, audio module information, or the like. The second electronic device 200 determines whether the connected first electronic device 100 includes a display, an audio module, or the like, and/or determines whether the display has at least a specific size.

In step S611, the second electronic device 200 supports at least one of a communication function or a UI function according to the device information. For example, the second electronic device 200 supports the UI function when the connected first electronic device 100 does not have a display with at least equal to the specified size or a UI support request is received from the connected device. In relation to support of the UI function, the second electronic device 200 outputs various screens required during provisioning of the connected first electronic device 100. For example, the second electronic device 200 outputs at least one of a screen of access to the server device 300, a subscription support screen, a communication profile download screen, or a communication profile installation completion screen. The second electronic device 200 supports the communication function when the connected first electronic device 100 has a display with at least the specified size. While supporting the communication function, the second electronic device 200 transfers provisioning-related information received from the connected first electronic device (e.g., a companion device or the first electronic device 100) to the server device 300, and may add information of the second electronic device 200 (e.g., provider information, a phone number for receiving an SMS message, information on a service being used, a rate payment system, a device location, or the like)

to the provisioning-related information according to a situation so as to transfer the information of the second electronic device 200 to the server device 300. For a profile download trigger of the connected device, the second electronic device 200 may transfer information thereof (e.g., mobile station international subscriber directory number (MSISDN), international mobile subscriber identity (IMSI), temporary mobile subscriber identity (TMSI), or the like) to the server device 300, and may relay a message (e.g., a type-2 SMS message) received from the server device 300 to the connected device.

According to various embodiments of the present disclosure, the second electronic device 200 establishes a communication channel to the server device 300 or the service device 400 using the fourth communication module 214, and supports transmission/reception of signals for supporting provisioning of the connected device. For example, the second electronic device 200 may establish a Wi-Fi or BT connection to the connected device through the third communication module 213, and may access the server device 300 via a cellular network using the fourth communication module 214 so that the connected device is connected to the server device 300. Here, the connected first electronic device 100 is provided with the cellular network of the second electronic device 200, so as to directly communicate with the server device 300. In this case, the second electronic device 200 may not perform addition of additional information (e.g., provider information, a phone number for receiving an SMS message, information on a service being used, a rate payment system, a device location, or the like). The second electronic device 200 performs the above-mentioned signal transmission/reception for supporting the communication function through background processing.

According to various embodiments of the present disclosure, the first electronic device 100 (or the connected device) outputs a provisioning UI in relation to provisioning. Here, the provisioning UI may include a QR code. When the second electronic device 200 obtains the QR code by using a camera or the like, or is connected to the first electronic device 100 through NFC tagging, or receives a provisioning support request from the first electronic device 100, the second electronic device 200 may activate a provisioning support function so as to support provisioning of the first electronic device 100. In the above-described operation of receiving a provisioning UI from the first electronic device 100, the second electronic device 200 may receive, from the first electronic device 100, information as shown in Table 1 below.

TABLE 1

| | Device information | Display | UI provision request | Detemination result |
|---|---|---|---|---|
| 1 | Large screen type | Yes | No information | Not provide |
| 2 | 1st watch type | Yes (limited U1) | Provision required | Provide |
| 3 | 2nd watch type | Yes (UI with specific size) | Provision not required | Not provide |
| 4 | Wrist wearable type | Yes | No information | Provide |
| 5 | M2M sensor type | None | No information/ not required | Provide |

If the second electronic device 200 receives the information of item number 1 from the first electronic device 100, the second control module 260 (e.g., an eSIM service manager module) of the second electronic device 200 determines that the first electronic device 100 is able to independently provide a UI since there is no information about a UI provision request and the first electronic device 100 is a large-screen-type device. Accordingly, the second electronic device 200 provides a communication function alone without providing a UI. If the information of item number 2 is received from the first electronic device 100, the second control module 260 of the second electronic device 200 may provide at least a portion of a UI related to provisioning of the first electronic device 100 through the touch screen 240 since the first electronic device 100 makes a UI provision request, even though the first electronic device 100 is provided with a display. If the information of item number 3 is received from the first electronic device 100, the second control module 260 of the second electronic device 200 may not provide a UI since the information indicates that the first electronic device 100 is able to provide a UI with at least a predetermined size and UI provision is not requested or is not necessary. If the information of item number 4 is received from the first electronic device 100, the second control module 260 of the second electronic device 200 may provide a UI thereof since the first electronic device 100 does not make a request for information regarding UI provision or is a specific type (e.g., wrist wearable type) of a device even though the first electronic device 100 is provided with a display. If the information of item number 5 is received from the first electronic device 100, the second control module 260 of the second electronic device 200 provides a UI thereof, since the device type is a sensor type, even though the information indicates that there is no information on UI provision or UI provision is not necessary.

Figure 7:
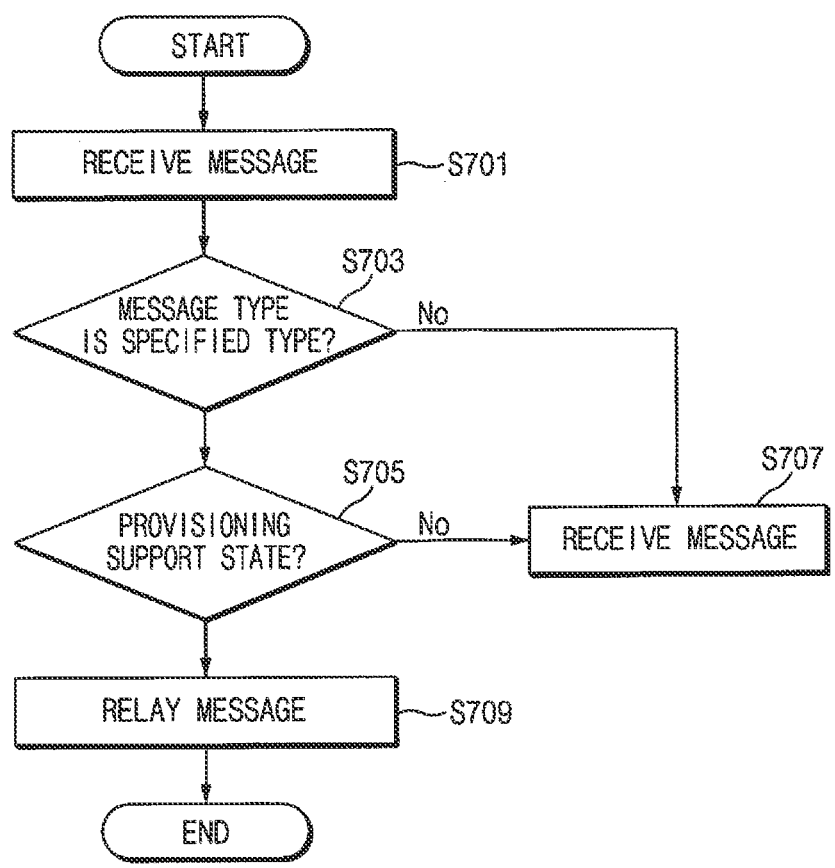
FIG. 7 is a flowchart illustrating another method for operating a second electronic device in relation to a communication profile according to various embodiments of the present disclosure.

FIG. 7 is a flowchart illustrating another method for operating a second electronic device in relation to a communication profile according to various embodiments of the present disclosure.

Referring to FIG. 7, in step S701, the second electronic device 200 receives a message from the server device 300. For example, if the second electronic device 200 transmits subscription request information for the first electronic device 100, to the server device 300, while performing a provisioning support function for the first electronic device 100, the second electronic device 200 may receive a specified message from the server device 300. Alternatively, the second electronic device 200 may transmit, to the server device 300, the subscription request information in relation to a provisioning function of the second electronic device 200, and may receive a message corresponding to the subscription request information. Furthermore, the second electronic device 200 may receive, from the server device 300, a message related to a wireless environment or a certain period.

In step S703, the second electronic device 200 determines whether the received message has a specified type (i.e., whether the message type is included in at least one predetermined message type). For example, the second electronic device 200 may determine whether the received message is a message (e.g., an SMS-type message such as SMS type-2 or SMS-PP data download) received for communication with a SIM from the server device 300 (e.g., the provisioning server device 303).

If the message has the specified type, the second electronic device 200 determines whether a current state is a provisioning support state in step S705. If the current state is not the provisioning support state or the message does not have the specified type in step S703, the second electronic device 200 performs a message reception process in step S707. For example, the second electronic device 200 may output a message reception notification. The second electronic device 200 outputs the received message through the touch screen 240.

If the current state is the provisioning support state, the second control module 260 (e.g., an eSIM service manager module) of the second electronic device 200 relays the message to the first electronic device 100 without transferring the message to a SIM of the second control module 260 in step S709.

Here, the control module 260 of the second electronic device 200 may convert the format of the message so that the message is compatible with a communication standard used for a connection to the first electronic device 100. After converting the format of the message, the second electronic device 200 transmits the message to the first electronic device 100. The first electronic device 100 may convert the message received from the second electronic device 200 so that the message is compatible with a UI of the first electronic device 100. For example, the first electronic device 100 may convert the message into a message format (e.g., an SMS format) supported by the first electronic device 100, and may transfer the converted message to an eUICC of the first electronic device 100. In this step, the first electronic device 100 establishes a secure channel to the provisioning server device 303 on the basis of contents of the message transferred to a SIM (e.g., UICC, eUICC, or eSIM) of the first electronic device 100.

According to various embodiments of the present disclosure, while the provisioning support function of the second electronic device 200 is activated, an SMS-type message for communicating with the SIM of the second electronic device 200 may be received from the provisioning server device 303 or the service device 400. In this case, the second electronic device 200 may transfer the message to the first electronic device 100. When the SIM (e.g., UICC or eUICC) of the first electronic device 100 determines that the received message is not intended to be sent to the SIM of the first electronic device 100 on the basis of the contents of the message, the SIM of the first electronic device 100 may return the message to the second electronic device 200 with or without adding, to the message, information indicating that the message is not intended for the SIM of the first electronic device 100. The second electronic device 200 checks the message received from the first electronic device 100. If the second electronic device 200 determines that the message is the same SMS message as the SMS message transmitted from the second electronic device 200 to the first electronic device 100 or the second electronic device 200 detects the information indicating that the message is not intended for the first electronic device 100, the second electronic device 200 may transfer the SMS message to the SIM (e.g., UICC or eUICC) of the second electronic device 200 so that the SMS message is processed.

When downloading of a communication profile of the first electronic device 100 through the secure channel is completed, the first electronic device 100 notifies the second electronic device 200 of completion of provisioning. When the second electronic device 200 is notified of the completion of provisioning, the second electronic device 200 deactivates the provisioning support function. After the provisioning support function is deactivated, the second electronic device 200 transfers a received SMS-type message (e.g., SMS type-2 or SMS-PP data download) to the SIM of the second electronic device 200 to process the SMS-type message, without transferring the SMS-type message to the first electronic device 100. According to various embodiments of the present disclosure, the second electronic device 200 may detect, through a monitoring operation, that a session for downloading a profile is terminated in response to completion of downloading of the communication profile of the first electronic device 100 through the secure channel. Alternatively, the second electronic device 200 may receive, from the provisioning server device 303, a notification regarding session termination. When the session termination is confirmed, the second electronic device 200 deactivates a provisioning support mode.

Figure 8:
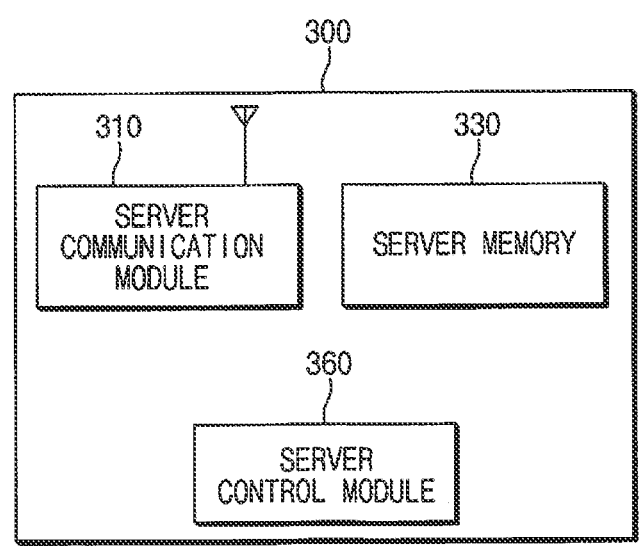
FIG. 8 is a diagram illustrating a configuration of a server device according to various embodiments of the present disclosure

FIG. 8 is a diagram illustrating a configuration of a server device according to various embodiments of the present disclosure.

Referring to FIG. 8, the server device 300 includes a server communication module 310, a server memory 330, and a server control module 360. The server device 300 is included in each of the subscription support server device 301 and/or the provisioning server device 303. For example, according to an embodiment of the present disclosure, each of the subscription support server device 301 or the provisioning server device 303 includes a server communication module 310, a server memory 330, and a server control module 360. Alternatively, according to another embodiment of the present disclosure, the subscription support server device 301 and the provisioning server device 303 may be designed and operated as one server device.

The server communication module 310 of the subscription support server device 301 establishes a communication channel to the second electronic device 200. For example, the server communication module 310 of the subscription support server device 301 establishes a communication channel to the fourth communication module 214 of the second electronic device 200. The server communication module 310 of the provisioning server device 303 establishes a communication channel to the subscription support server device 301. For example, the server communication module 310 of the provisioning server device 303 establishes a communication channel to the subscription support server device 301 by a wired connection or wirelessly. The server communication module 310 of the provisioning server device 303 receives subscription support information from the subscription support server device 301.

The server memory 330 of the subscription support server device 301 stores information related to a subscription support screen. When the subscription support server device 301 is connected to the second electronic device 200, the subscription support server device 301 provides the information related to the subscription support screen to the second electronic device 200. If subscription request information generated in response to selection of a service item from the subscription support screen is received from the second electronic device 200, the server memory 330 of the subscription server device 301 stores the subscription request information temporarily or semipermanently. The subscription request information is transferred to the provisioning server device 303. The server memory 330 of the provisioning server device 303 stores the subscription support information received from the subscription support server device 301. Furthermore, the provisioning server device 303 may temporarily or semipermanently store a communication profile generated on the basis of the subscription request information. The communication profile is provided to the first electronic device 100.

The server control module 360 of the subscription support server device 301 handles provision of a subscription support screen. For example, if the second electronic device 200 is connected to the subscription support server device 301, the server control module 360 of the subscription support server device 301 determines whether a current state is a provisioning support state for the first electronic device 100 or a provisioning performing state for the second electronic device 200. In relation to this operation, while accessing the subscription support server device 301, the second electronic device 200 provides a guide message for allowing the subscription support server device 301 to determine whether the access by the second electronic device 200 is for supporting provisioning or for performing provisioning. Alternatively, after being connected to the subscription support server device 301, the second electronic device 200 provides a notification about the provisioning support state or the provisioning performing state.

The server control module 360 of the subscription support server device 301 provides different subscription support screens according to a provisioning state (e.g., the provisioning support state or the provisioning performing state) of the second electronic device 200. For example, if a current state is the provisioning support state, the server control module 360 of the subscription support server device 301 provides a subscription support screen for service subscription of the first electronic device 100 or a subscription support screen for associated service subscription of the first and second electronic devices 100 and 200. If the current state is the provisioning performing state, the server control module 360 of the subscription support server device 301 provides a subscription support screen for service subscription of the second electronic device 200. The subscription support screens may include one or more different service items provided according to a device type of an electronic device. For example, the subscription support screen for the first electronic device 100 may include a voice call service item, a streaming service item, a healthcare service item, or the like. The subscription support screen for the second electronic device 200 may include a voice or video call service item, a data communication service item, a cloud service item, or the like.

As the subscription support screen is provided, the server control module 360 of the subscription support server device 301 collects subscription request information from the second electronic device 200. The subscription request information collected is temporarily stored in the server memory 330 of the subscription support server device 301. The subscription request information includes service selection item information, communication service-related information of the first electronic device 100 (e.g., unique identification information of the first electronic device 100), communication service-related information of the second electronic device 200 (e.g., added when an associated service subscription request is made), or communication profile type information. The server control module 360 of the subscription support server device 301 transfers the subscription request information to the provisioning server device 303.

The server control module 360 of the provisioning server device 303 establishes a communication channel to the subscription support server device 301, and generates a communication profile on the basis of the subscription request information provided from the subscription support server device 301. As described above, the communication profile includes various information required for an electronic device to access the service device 400. The server control module 360 of the provisioning server device 303 may establish a secure channel to the first electronic device 100 if the communication profile is generated. Alternatively, the server control module 360 of the provisioning server device 303 may establish a secure channel to the first electronic device 100 via the second electronic device 200. If the secure channel is established, the server control module 360 of the provisioning server device 303 transmits the generated communication profile to the first electronic device 100.

Figure 9:
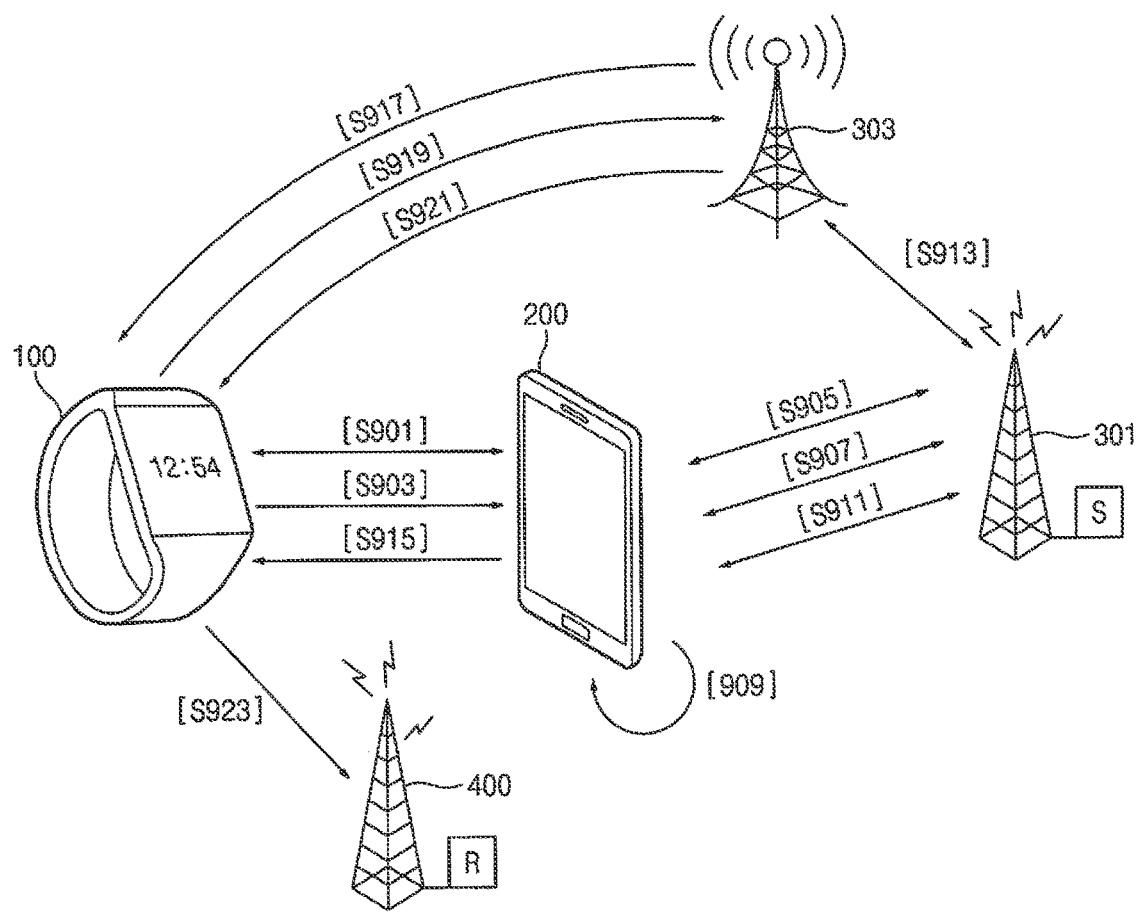
FIG. 9 is a diagram illustrating a flow of signals for using a communication function of a second electronic device in relation to a communication profile according to various embodiments of the present disclosure.

FIG. 9 is a diagram illustrating a flow of signals for using a communication function of a second electronic device in relation to a communication profile according to various embodiments of the present disclosure.

Referring to FIG. 9, according to an embodiment of the present disclosure, the first electronic device 100 has the first provisioning profile 151 stored in the first eUICC 150. The first provisioning profile 151 is a profile designed to enable access to a specific service provider network for provisioning. When the first electronic device 100 already includes the first provisioning profile 151 when the first electronic device 100 is booted, the first electronic device 100 performs a communication service subscription using a modem function of the second electronic device 200 associable with the first electronic device 100. If the first electronic device 100 does not have the first provisioning profile 151, the first electronic device 100 outputs a notification message to a display of the first electronic device 100 so as to induce a user to perform a provisioning procedure.

For example, the first electronic device 100 may output, to a screen, a message (e.g., a pop-up message) for requesting an approval to perform the provisioning procedure, and, if a user approval button is selected by the user, the first electronic device 100 activates a short-range communication module (e.g., a BT or Wi-Fi module) so that the second electronic device 200 capable of providing a display screen and a user UI is connected in step S901.

When the first electronic device 100 is connected to the second electronic device 200, the first electronic device 100 transfers, to the second electronic device 200, provisioning-related information of the first electronic device 100 (e.g., device information (IMEI or the like), SIM identification information (eUICC-ID (EID)), server identification information (e.g., an ID of the relevant SM-SR (SRID)) required for provisioning, a server connection address (IP or HTTP address), or the like), in step S903.

The second electronic device 200, after receiving, the provisioning-related information, provides a screen for provisioning of the first electronic device 100 by executing a pre-installed program code or an application installed for supporting provisioning. In step S905, the second electronic device 200 accesses a server device (e.g., a provisioning server device 303, a subscription support server device 301, a service device, or the like) for provisioning of the first electronic device 100 on the basis of information such as server identification information and a specific server connection address, and then transfers the device information, the SIM identification information, and the like of the first electronic device 100 to the server device so as to request a communication profile.

Accordingly, in step S907, the second electronic device 200 receives, from the subscription support server device 301, a list of communication profiles that allow subscription through the first electronic device 100.

In step S909, the second electronic device 200 outputs a communication profile that is differentiated according to a nation where the first electronic device 100 is located among the communication profiles in the list. The nation where the first electronic device 100 is currently located may be determined on the basis of a mobile country code (MCC) value of a network accessed through the fourth communication module 214 of the second electronic device 200 or location information measured using a GPS module, a Wi-Fi module, or a cell of the first electronic device 100 (or at least one of the first electronic device 100 or the second electronic device 200).

A method for outputting the differentiated communication profiles may include a method in which nation items located within a certain distance from the location information or related with the location information, among items in the communication profile list received from the subscription support server device 301, are displayed on an upper portion of the list. Furthermore, the method for outputting the differentiated communication profiles may include a method in which items related to the location information are highlighted or displayed differently from other items (e.g., displayed with different color, different font, or different size) or a method in which an image or a text of each nation is displayed adjacent to an area where the items related to the location information are displayed.

The second electronic device 200 may provide, to the touch screen 240, a subscription support screen or menu including nation information, provider information, service contract option information, price information, or the like. Accordingly, a user may select a specific option, may perform filtering, or may perform sorting (e.g., in an ascending or descending order) of the menu options.

The options may include a contract option that may include a prepaid SIM purchase option, a stipulated payment option, an option of selecting a period of a contract of use of SIM based on a specific provider, a circuit service (CS) selection option, a packet data service (PS) selection option, an LTE service selection option, or an option of selecting a specific network (e.g., a code division multiple access (CDMA) network, a global system for mobile communications (GSM) network, third-generation (3G), or a wideband-CDMA (W-CDMA) network). Furthermore, the contract option may include an option of selecting a service for using the same telephone number as that of the second electronic device 200 (e.g., 1 number-2 SIM service), an option of selecting a multi-number use service (e.g., 2 number-2 SIM service), or an option of selecting an integrated service for integrating a plurality of electronic devices into one account. Furthermore, the contract option may include an option regarding whether to combine a communication service rate with a service account and a payment account of the second electronic device 200 or set an additional account and an additional payment account for the communication service rate.

If the user selects a specific communication profile and contract option from the subscription support screen, the second electronic device 200 transfers subscription request information including corresponding selection information to the subscription support server device 301 that has provided the communication profile list in step S911. Then, in step S913, the subscription support server device 301 sends, to the provisioning server device 303, a request for generating a communication profile based on the subscription request information. Meanwhile, in step S915, the second electronic device 200 transfers the selection information to the first electronic device 100.

The provisioning server device 303 that has received the subscription request information to be used for the first electronic device 100 generates and encrypts a communication profile to be used in the first electronic device 100 and the eUICC, and sends a session trigger message to the first electronic device 100 so as to allow the first electronic device 100 to make a profile download request in step S917. In step S919, the first electronic device 100, after receiving the message, sends a profile download request to the provisioning server device 303 so that a secure channel may be established between the first electronic device 100 and the provisioning server device 303. In step S921, the first electronic device 100 downloads the communication profile to a specific memory area in the eUICC.

In step S923, the first electronic device 100 may access the service device 400 and undergoes an authentication procedure using authentication information and subscription information of the downloaded communication profile, so as to perform a network registration process. As the network registration process is performed, the first electronic device 100 is provided with a provider service to which the user is subscribed.

Figure 10:
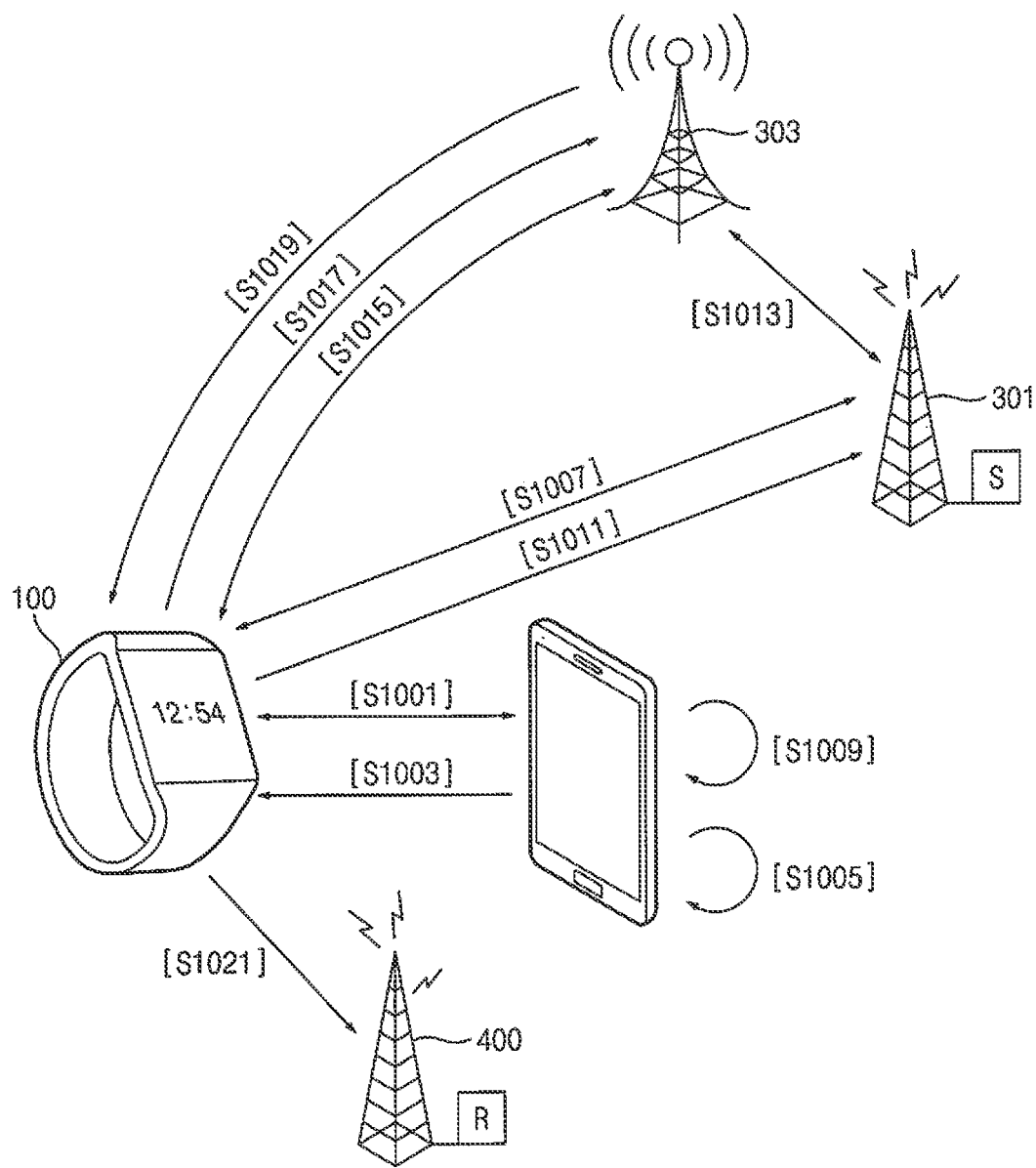
FIG. 10 is a diagram illustrating a flow of signals for using a UI function of a second electronic device in relation to a communication profile according to various embodiments of the present disclosure.

FIG. 10 is a diagram illustrating a flow of signals for using a UI function of a second electronic device in relation to a communication profile according to various embodiments of the present disclosure.

Referring to FIG. 10, the first electronic device 100 outputs a provisioning UI according to a provisioning procedure, and establishes a communication channel to the second electronic device 200 using a short-range communication module (e.g., a BT or Wi-Fi module) according to a user input, in step S1001.

If the first electronic device 100 is connected to the second electronic device 200, the second electronic device 200 provides a screen for provisioning of the first electronic device 100 by executing an application or a program code installed in the second electronic device 200, in step S1003. Alternatively, in step S1005, data of the first electronic device 100 is provided to the second electronic device 200 so that the data is used as a UI compatible with a display screen of the second electronic device 200 or is processed by the second electronic device 200 according to a user input.

In step S1007, the first electronic device 100, using the device information and SIM identification information of the first electronic device 100, accesses, for provisioning, the subscription support server device 301 using server identification information and a server connection address. The first electronic device 100 receives, from the subscription support server device 301, a list of MNO profiles that allow subscription of the first electronic device 100. The received communication profile list is transferred to the second electronic device 200 through the short-range communication connection. In step S1009, the second electronic device 200 outputs a communication profile differentiated according to a nation where the first electronic device 100 is located among the communication profiles in the list. To determine the nation whether the first electronic device 100 is located, location information of the second electronic device 200 or location information provided from the first electronic device 100 to the second electronic device 200 may be used. Furthermore, in a similar manner to step S909 of FIG. 9, the second electronic device 200 provides, onto the touch screen 240, a configuration menu including nation information, provider information, contract option information, price information, or the like so that the user is able to select a specific option, perform filtering, or perform an ascending/descending sort. If the user selects a specific communication profile and contract option from the subscription support screen of the second electronic device 200, the second electronic device 200 transfers subscription request information corresponding to the selected information to the first electronic device 100.

In step S1011, the first electronic device 100 may transfer, to the subscription support server device 301, the subscription request information provided from the second electronic device 200. The subscription support server device 301, after receiving the subscription request information related to the first electronic device 100, transfers the subscription request information to the provisioning server device 303 in step S1013. The provisioning sever device 303 generates and encrypts a communication profile to be used in a specific device (e.g., the first electronic device 100) and eUICC.

In step S1015, the provisioning server device 303 sends a session trigger message to the first electronic device 100 so that the first electronic device 100 is able to make a profile download request. The first electronic device 100, after receiving the message, sends a profile download request to the provisioning server device 303 so that a secure channel can be established between the first electronic device 100 and the provisioning server device 303 in step S1017. In step S1019, the communication profile is downloaded to a specific memory area in the eUICC of the first electronic device 100.

In step S1021, the first electronic device 100 accesses the service device 400 and undergoes an authentication procedure using authentication information and subscription information of the downloaded communication profile, so as to complete a registration process and receive a provider service.

Figure 11A:
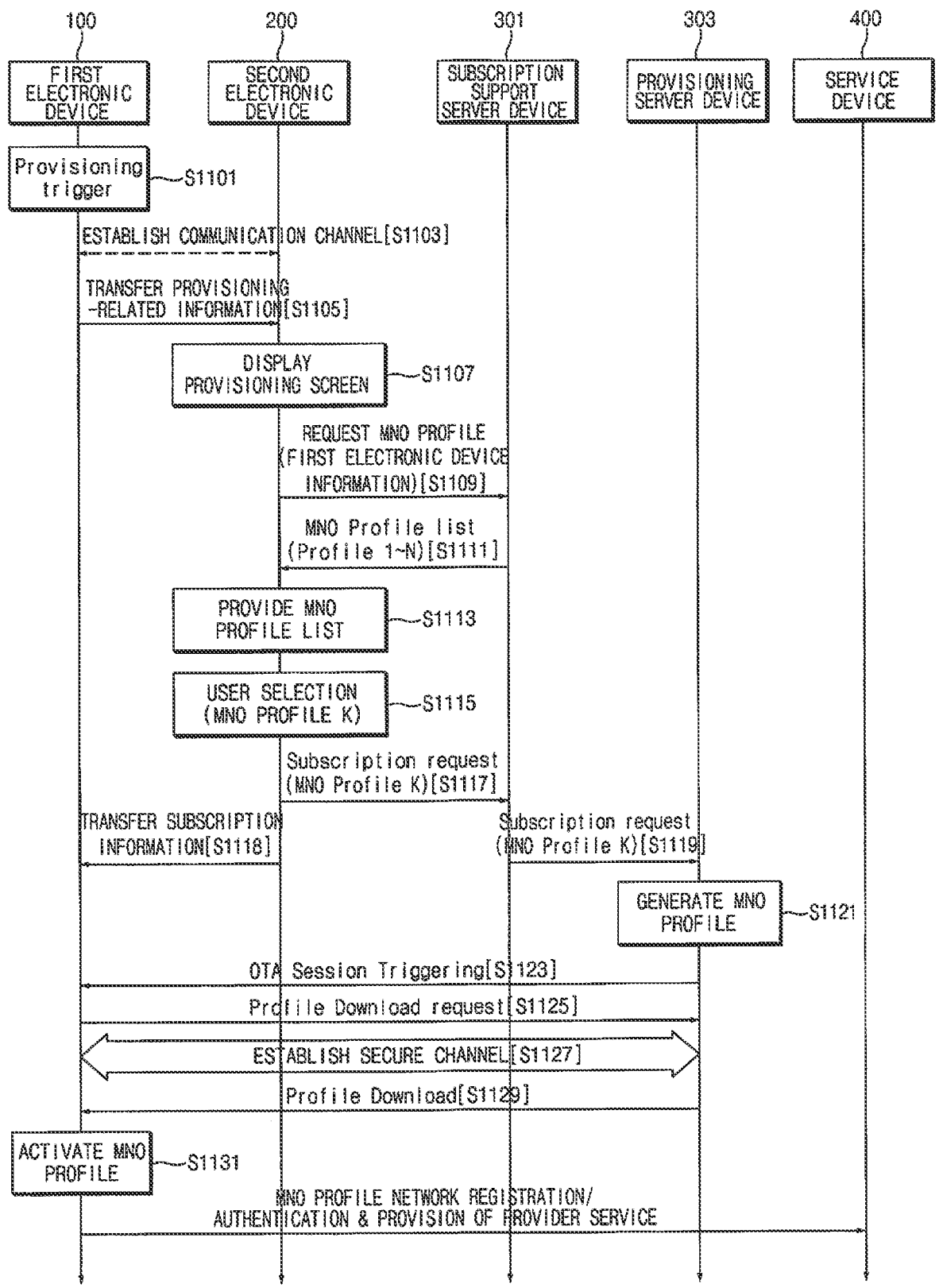
FIG. 11A is a diagram illustrating a flow of signals among devices related to a communication profile according to various embodiments of the present disclosure.

FIG. 11A is a diagram illustrating a flow of signals among devices related to a communication profile according to various embodiments of the present disclosure.

Referring to FIG. 11A, in relation to installation of a communication profile, the first electronic device 100 performs a provisioning trigger, in step S1101. For example, the first electronic device 100 may output a provisioning UI to wait for selection by a user, may output at least a portion of the provisioning UI through the second electronic device 200, or may output guide information or code information related to provisioning to a display so as to induce a user to establish a communication channel to the second electronic device 200.

In step S1103, a communication channel, through use of a short-range communication module, is established between the first electronic device 100 and the second electronic device 200. When the communication channel is established, the first electronic device 100 transfers first electronic device information (e.g., provisioning-related information) to the second electronic device 200, in step S1105. In step S1107, the second electronic device 200 presents a provisioning screen. The provisioning screen is a screen output to the touch screen 240 of the second electronic device 200 to support provisioning of the first electronic device 100. In this step, the second electronic device 200 accesses the subscription support server device 301 using provisioning-related information.

In step S1109, the second electronic device 200 sends a request for a communication profile list (e.g., an MNO profile list) related to the first electronic device 100, to the subscription support server device 301. In step S1111, the second electronic device 200 receives the requested communication profile list (MNO profile list) from the subscription support server device 301. Here, the received communication profile list (MNO profile list) may include a plurality of profile items (e.g., profiles 1 to N). The plurality of profile items may include profile items related to providers of services that can be provided to the first electronic device 100. In step S1113, the second electronic device 200 outputs the received communication profile list (MNO profile list). In step S1115, the second electronic device 200 collects information indicating a user selection of a specific communication profile (e.g., MNO profile k from among profiles 1 to N).

In step S1117, the second electronic device 200 transmits subscription request information to the subscription support server device 301. Here, the subscription request information includes specific communication profile selection information (e.g., MNO profile k) and contract information (e.g., contract option selection information) according to the user selection. In step S1118, the second electronic device 200 transfers subscription information corresponding to the subscription request information, to the first electronic device 100. In step S1119, the subscription support server device 301 sends, to the provisioning server device 303, a request for generating a communication profile corresponding to the specific communication profile selection information (e.g., MNO profile k) selected for the first electronic device 100.

In step S1121, the provisioning server device 303 may generate the communication profile (e.g., MNO profile k) for the first electronic device 100. In step S1123, the provisioning server device 303 may perform session triggering (over the air (OTA) session triggering) to the first electronic device 100. In step S1125, the first electronic device 100 sends a profile download request to the provisioning server device 303. Accordingly, in step S1127, a secure channel is established between the first electronic device 100 and the second electronic device 200.

In step S1129, the provisioning server device 303 allows the first electronic device 100 to download a communication profile. In step S1131, the first electronic device 100 activates the received communication profile so as to access the service device 400. In step S1133, the first electronic device 100 performs communication profile network registration and authentication, and uses a communication service provided by the service device 400.

Figure 11B:
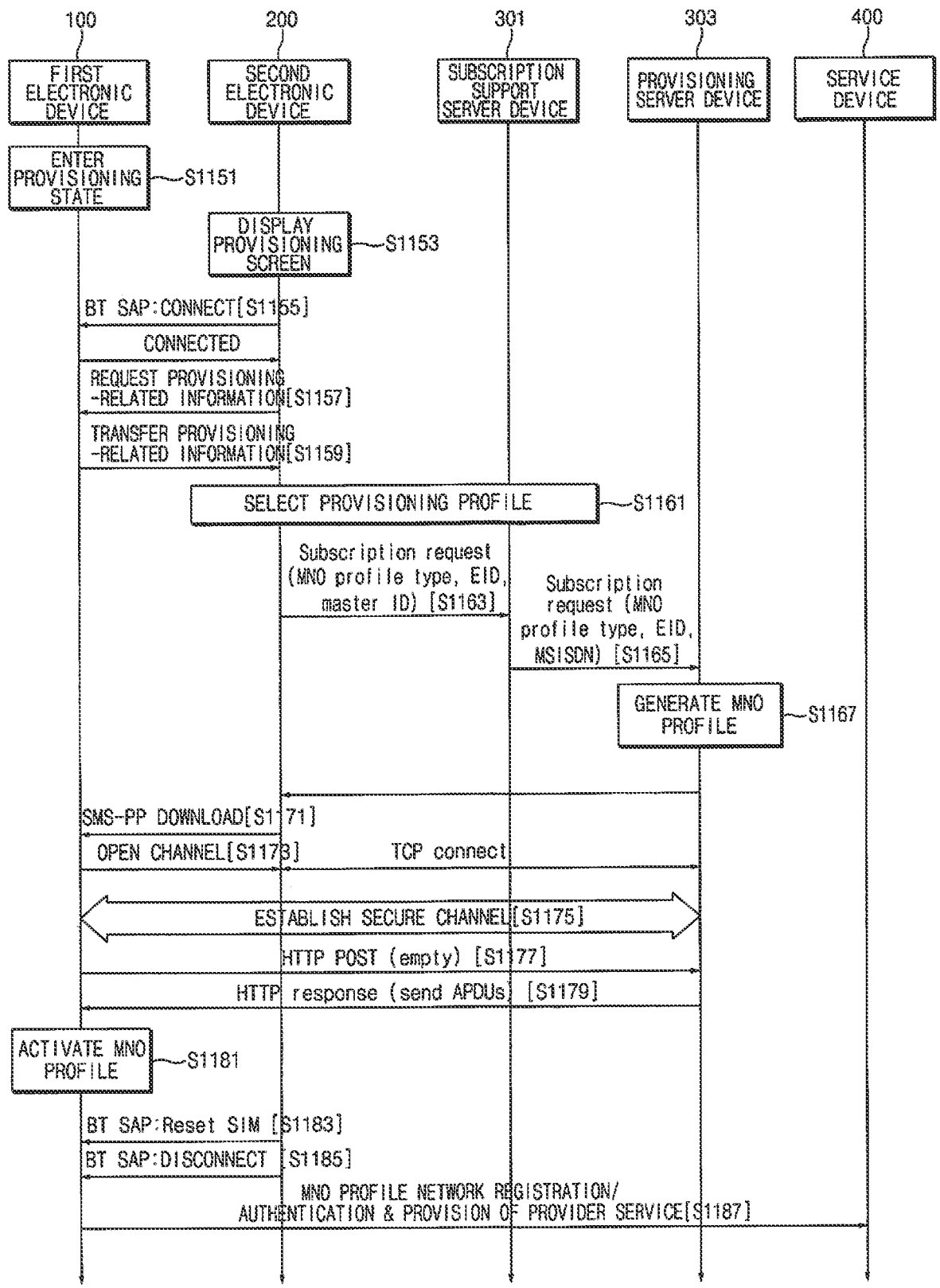
FIG. 11B is a diagram illustrating another example of a flow of signals among devices related to a communication profile according to various embodiments of the present disclosure.

FIG. 11B is a diagram illustrating another example of a flow of signals among devices related to a communication profile according to various embodiments of the present disclosure.

Referring to FIG. 11B, in relation to installation of a communication profile, the first electronic device 100 enters a provisioning state, in step S1151. For example, the first electronic device 100 outputs a provisioning UI, and enters a BT SAP server mode (or function), when an event related to a provisioning request occurs. While the first electronic device 100 performs the BT SAP server function, the second electronic device 200 displays a provisioning execution screen according to control input from a user, in step S1153. The second electronic device 200 is connected to a BT SAP server of the first electronic device 100 in relation to provisioning. Thereafter, the first eUICC 150 of the first electronic device 100 may be directly controlled by the second electronic device 200 (e.g., by the UICC management module 285). In step S1155, the second electronic device 200 controls the first eUICC 150 of the first electronic device 100 according to a BT SAP standard in addition to the UICC or eUICC included in the second electronic device 200. Through the above-described operations, a BT-SAP-based communication channel is established between the first and second electronic devices 100 and 200.

When the BT-SAP-based communication channel is established, the second electronic device 200 transmits an APDU command to the first electronic device 100 to request provisioning-related information of the first electronic device 100, in step S1157. Upon receiving a request for the provisioning-related information from the second electronic device 200 via the BT SAP channel, the first electronic device 100 transfers the provisioning-related information to the second electronic device 200 in response to the request, in step S1159. The provisioning-related information may include an eUICC ID (EID), and may further include additional information such as IMEI according to a design method or a protocol definition. In step S1161, the second electronic device 200 presents a downloadable MINO profile list or a contract option (e.g., 1 number-2 SIM service contract option, 2 number-2 SIM service contract option, data-only service contract option, or the like) so that a user is able to select a specified MNO profile or contract option. Output of the MINO profile list or selection of an MNO profile or contract option may be performed in a similar manner to or the same manner as steps S1109 to S1115 described above with reference to FIG. 11A.

When an MNO profile is selected, the second electronic device 200 sends an MNO profile download request to the subscription support server device 301 in step S1163. Information transmitted with the download request may include, for example, the type of the selected MNO profile or contract option contents, the profile-related information of the first electronic device 100 (e.g., EID or IMSI) received in step S1159, or an master ID for identifying subscription information of the second electronic device 200, such as MSISDN. In step S1165, the subscription support server device 301 transfers, to the provisioning server device 303, the download request received from the second electronic device 200. Here, the master ID may include SMS reception information (MSISDN) of the second electronic device 200 so that the provisioning server device 303 is able to send an SMS push request to the second electronic device 200.

In step S1167, the provisioning server device 303 generates the communication profile (MNO profile) for the first electronic device 100. In step S1169, the provisioning server device 303 performs session triggering (OTA session triggering) to the second electronic device 200. Here, a session triggering message may include EID information of the first electronic device 100 so as to be transferred to the first eUICC 150 connected through the first electronic device 100.

In step S1171, the second electronic device 200 transmits, to the first eUICC 150 of the first electronic device 100, a received SMS push message through SMS-PP download APDU (International Organization for Standardization (ISO)/International Electrotechnical Commission (IEC) 7816-4). In step S1173, the first eUICC 150 of the first electronic device 100 may send an open channel APDU including an address of a provisioning service device to the second electronic device 200 so that the second electronic device 200 may establish a TCP connection to the provisioning server device 303. Thereafter, the first electronic device 100 may load data to be transferred to the provisioning server device 303 on the APDU to be transferred to the second electronic device 200 so as to transfer the data via the TCP connection between the second electronic device 200 and the provisioning server device 303 (refer to the biometric application programming interface (API) (BioAPI) interworking protocol (BIP)). In step S1175, the first eUICC 150 of the first electronic device 100 establishes a secure channel to the provisioning server device 303 on the basis of the TCP connection established in step S1173.

If the secure channel is established, in step S1177, the first eUICC 150 of the first electronic device 100 transmits an empty HTTP request (HTTP post) to the provisioning server device 303, and, in step S1179, the provisioning server device 303 transmits, to the first electronic device 100, an APDU command for downloading an MNO profile as an HTTP response. Thereafter, when MNO profile downloading is completed by repeating the above-mentioned HTTP post/response, the first electronic device 100 activates the MNO profile, in step S1181. In step S1183, if necessary, the second electronic device 200 may reset the first eUICC 150 of the first electronic device 100 (e.g., in response to a user request, occurrence of an error in the MNO profile, or occurrence of an error while activating the MNO profile). If the MNO profile is activated in the first electronic device 100, the second electronic device 200 may release the BT SAP connection to the first electronic device 100 in step S1185. In step S1187, the first electronic device 100 may perform communication profile network registration and authentication, and may use a communication service provided by the service device 400.

In the above-mentioned operations, the second control module 280 of the second electronic device 200 generates a plurality of instances related to the UICC management module 285. For example, the second control module 280 generates (or include) a first UICC manager for managing the second eUICC 250 related to communication service operation of the second control module 280 and a second UICC manager for performing provisioning of the first eUICC 150 of the first electronic device 100. While the second electronic device 200 provides a communication service (including a communication service provided by the second electronic device 200 and supporting provisioning with respect to the first eUICC 150), the first UTCC manager performs UICC (or eUICC) management. When a request for provisioning of the first eUICC of the first electronic device 100 is made, the second UICC manager is uploaded to a control module or is generated. The second UICC manager performs control of a provisioning operation related to the first eUICC described above with reference to FIG. 11B. A resource of the second electronic device 200 used in relation to the second UICC manager is returned when the MNO profile of the first electronic device 100 is completely downloaded or activated. In the above-described operations, the second UTCC manager controls the BT SAP connection to the first electronic device 100. Furthermore, the second UICC manager supports collection of provisioning-related information of the first electronic device 100, transfer of the provisioning-related information to a server device (e.g., a subscription support server device), establishment of a secure channel between the first electronic device 100 and a server device (e.g., a provisioning server device) after transmitting the provisioning-related information, or processing of an APDU required for transmitting an MNO profile.

Although, in the above-described example, the first electronic device 100 is connected to the second electronic device 200 using the BT SAP, embodiments of the present are not limited thereto. For example, the first electronic device 100 may be connected to the second electronic device 200 through near field communication (NFC). In this embodiment, the first electronic device 100 may operate in an NFC card emulation mode, and the second electronic device 200 may operate as an NFC reader. The first and second electronic devices 100 and 200, while they are connected to each other via NFC communication, perform data transmission/reception on the basis of an APDU in a similar manner or the same manner as that for the BT SAP. Accordingly, the first and second electronic devices 100 and 200 connected to each other via NFC communication perform MNO profile downloading through operations similar to those illustrated in FIG. 11B.

Figure 12:
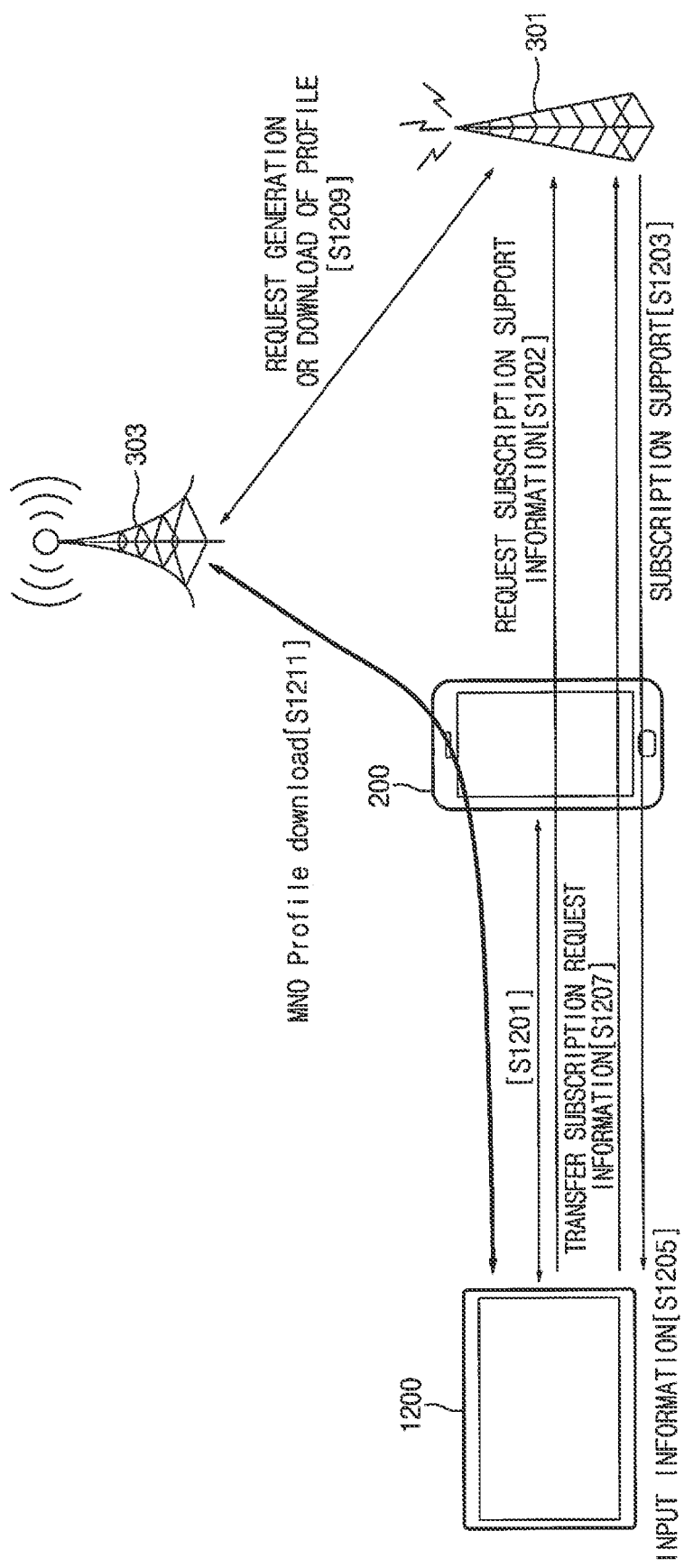
FIG. 12 is a diagram illustrating a flow of signals for using a relay function of a second electronic device in relation to a communication profile according to various embodiments of the present disclosure.

FIG. 12 is a diagram illustrating a flow of signals for using a tethering function of a second electronic device in relation to a communication profile according to various embodiments of the present disclosure.

Referring to FIG. 12, a first electronic device 1200 (e.g., a tablet PC, a note PC, an electronic pad, a slate PC, or the like) is equipped with an eUICC (or another secure element), but is not equipped with a provisioning profile. In step S1201, the first electronic device 1200 attempts to establish a short-range communication channel (e.g., a communication channel using Wi-Fi, BT, NFC, or the like) to the second electronic device 200 connectable to the subscription support server device 301 to download a communication profile.

When the first electronic device 1200 is enabled to access the subscription support server device 301 based on the connection to the second electronic device 200, the first electronic device 1200 sends a request for subscription support information to the subscription support server device 301 using a communication function of the second electronic device 200 in step S1202. Here, the first electronic device 1200 sends additional information, such as EID, IMEI, SRID, location information of the first electronic device 1200, or manufacturer information of the first electronic device 1200 together with an information request message for requesting the subscription support information. The communication function of the second electronic device 200 is a tethering function using a communication function for connecting the first electronic device 1200 to the third communication module 213 and a communication function for connecting the server device 300 or the service device 400 to the fourth communication module 214.

The subscription support server device 301, which has received the subscription support information request, transfers, to the first electronic device 1200, subscription support information (e.g., a list of profiles currently downloadable by the first electronic device 1200) generated in consideration of the additional information using the tethering function of the second electronic device 200, in step S1203. In step S1205, the first electronic device 1200 transfers, to the subscription support server device 301, a user's subscription request information generated automatically or generated according to a user selection using the tethering function of the second communication module 112.

Upon receiving the subscription request information, the subscription support server device 301 transfers, to the provisioning server device 303, a message for requesting generation of or downloading of a profile, in step S1209. In step S1211, the provisioning server device 303, which has received the message, establishes a secure channel to the first electronic device 1200 via the second electronic device 200. The first electronic device 1200 downloads a communication profile through the secure channel established.

Figure 13:
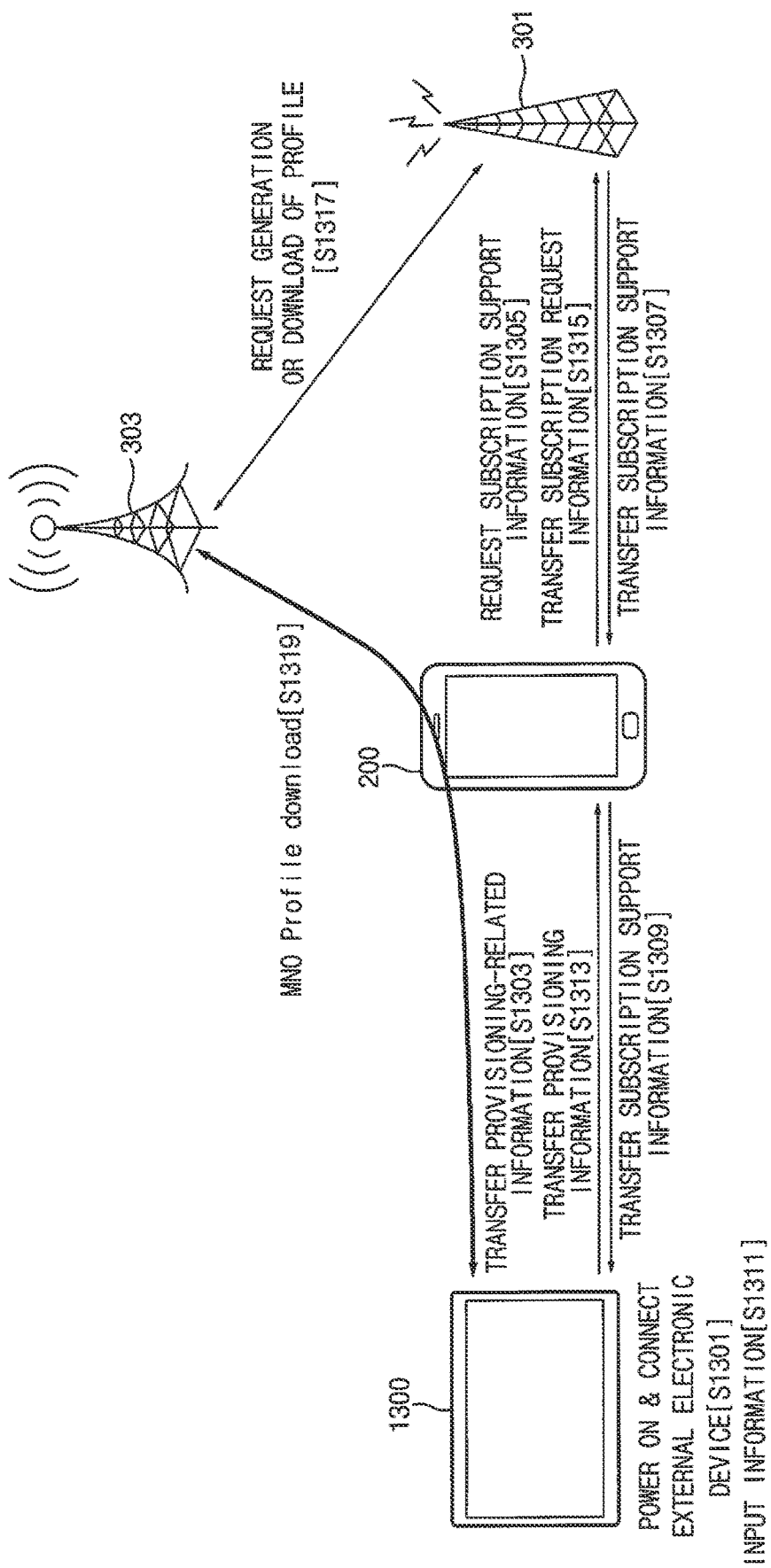
FIG. 13 is a diagram illustrating a flow of signals based on information processing of a second electronic device in relation to a communication profile according to various embodiments of the present disclosure.

FIG. 13 is a diagram illustrating a flow of signals based on information processing of a second electronic device in relation to a communication profile according to various embodiments of the present disclosure.

Referring to FIG. 13, according to various embodiments of the present disclosure, the second electronic device 200 supports processing additional subscription information, in addition to the tethering function described above with reference to FIG. 12. In step S1301, a first electronic device 1300, which is not equipped with a provisioning profile, performs initialization as power is supplied to the first electronic device 1300. The first electronic device 1300 may perform connection to the second electronic device 200 according to a user input or a set schedule.

When the first electronic device 1300 is connected to the second electronic device 200, the first electronic device 1300 transfers provisioning-related information to the second electronic device 200 in step S1303. Upon receiving the provisioning-related information, the second electronic device 200 sends a request for subscription support information to the subscription support server device 301 based on the provisioning-related information in step S1305. Here, the second electronic device 200 additionally sends, to the subscription support server device 301, information, such as current location information of the second electronic device 200 or information regarding a provider to which the second electronic device 200 subscribes. In step S1307, the subscription support server device 301 transfers, to the second electronic device 200, subscription support information (e.g., an MNO profile list) corresponding to the additional information provided from the second electronic device 200. For example, when the additional information provided from the second electronic device 200 includes information indicating a specific provider for which the second electronic device 200 subscribes, the subscription support server device 301 transfers, to the second electronic device 200, subscription support information matched to the provider (e.g., an MNO profile list of the provider). In step S1309, the second electronic device 200 transfers, to the first electronic device 1300, the subscription support information received from the subscription support server device 301.

In step S1311, the first electronic device 1300 outputs the received subscription support information, and generates subscription request information automatically or manually, in response to user selection. In step S1313, the first electronic device 1300 transmits the subscription request information to the second electronic device 200. In step S1315, the second electronic device 200 transmits the subscription request information to the subscription support server device 301. According to an embodiment of the present disclosure, the second electronic device 200 adds, to the subscription request information generated by the first electronic device 1300, information for issuing instructions to integrate the first electronic device 1300 and the second electronic device 200 into a multi-device and device information (e.g., IMEI, IMSI, serial number, or the like) of the second electronic device 200 required for integrating the first electronic device 1300 and the second electronic device 200, and transmits the subscription request information to the subscription support server device 301 in step S1315. The second electronic device 200 also transmits, to the subscription support server device 301, the subscription request information to which information for requesting that the first electronic device 1300 and the second electronic device 200 should have the same telephone number (e.g., MSISDN) and a telephone number of the second electronic device 200 are added.

The subscription support server device 301, which has received the subscription request information, sends a request to generate or download a profile to the provisioning server device 303, in step S1317. In step S1319, a secure channel is established between the first electronic device 1300 and the provisioning server device 303 via the second electronic device 200, and a communication profile is downloaded based on the secure channel.

In the above-described operations, while requesting the subscription support information, the second electronic device 200 sends a request to the subscription support server device 301 to provide the subscription support information including an option of association with the first electronic device 1300. Accordingly, the subscription support server device 301 transfers the subscription support information to the first electronic device 1300 via the second electronic device 200. The subscription support information includes service items (or contract options) that may be operated by the first electronic device 1300 alone and service items (or contract options) that may be operated by associating the first electronic device 1300 with the second electronic device 200. A user selects an MNO profile and contract options from a subscriptions support screen output to a display of the first electronic device 1300. According to the user's selection, the subscription request information for requesting an associated service is transmitted to the subscription support server device 301 via the second electronic device 200 so that a communication profile corresponding to the subscription request information can be generated. According to various embodiments of the present disclosure, the communication service items operated by the first electronic device 1300 alone may be output to the display of the first electronic device 1300, and the communication service items associated with the first electronic device 1300 and the second electronic device 200 may be output to the second electronic device 200. The user may select respective service items from the first electronic device 1300 and the second electronic device 200, and may make a request for subscription for desired communication services.

Figure 14:
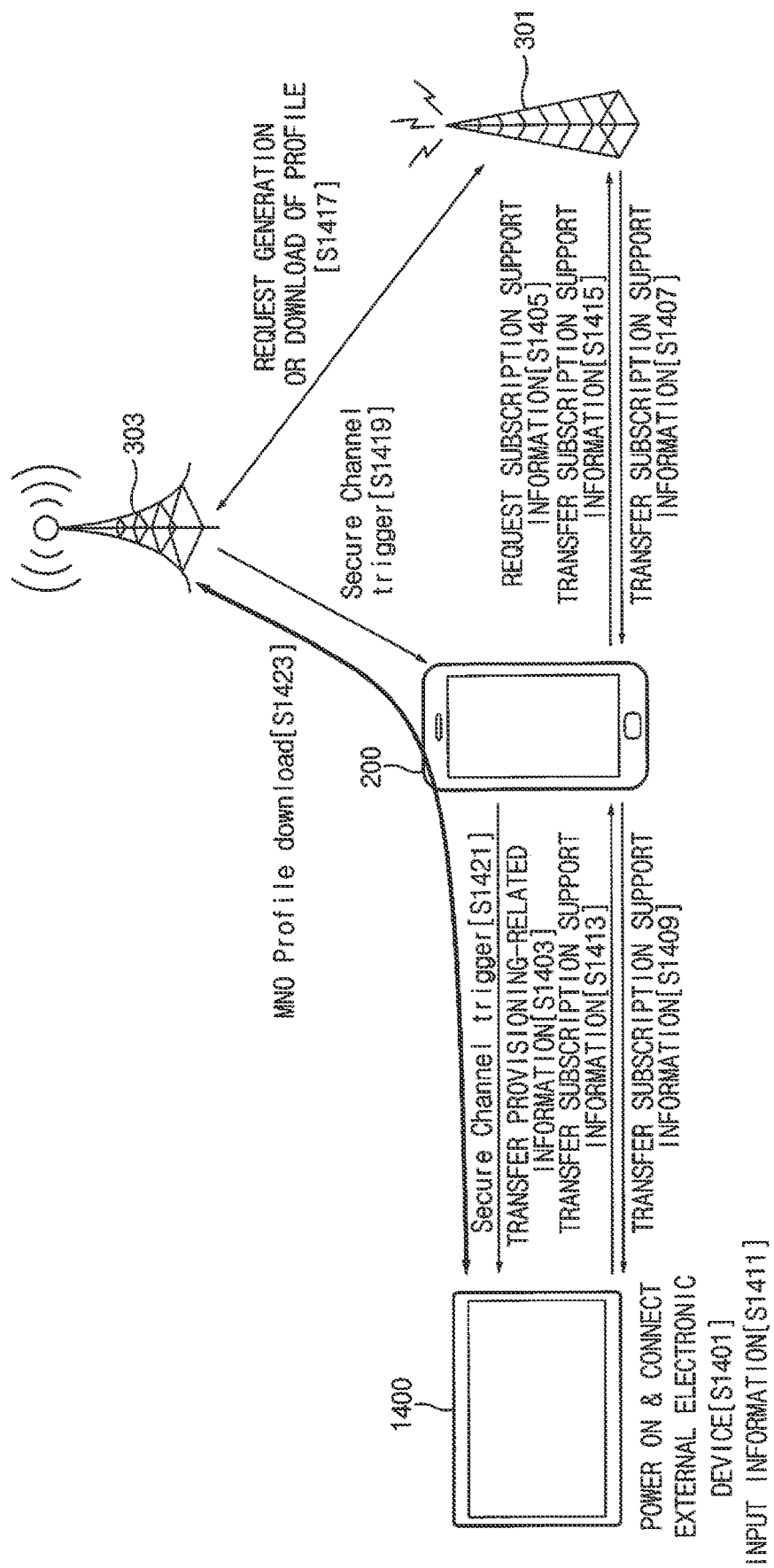
FIG. 14 is a diagram illustrating a flow of signals for using a secure channel establishing function of a second electronic device in relation to a communication profile according to various embodiments of the present disclosure.

FIG. 14 is a diagram illustrating a flow of signals for using a secure channel establishing function of a second electronic device in relation to a communication profile according to various embodiments of the present disclosure.

Referring to FIG. 14, in step S1401, a first electronic device 1400 establishes a connection to the second electronic device 200 as power is supplied to the first electronic device 1400. When the second electronic device 200 is connected to the first electronic device 1400, the first electronic device 1400 transfers provisioning-related information to the second electronic device 200 in step S1403. In step S1405, the second electronic device 200 sends a request for subscription support information to the subscription support server device 301 using the provisioning-related information. In step S1407, the subscription support server device 301 transmits the subscription support information to the second electronic device 200. In step S1409, the second electronic device 200 transmits the subscription support information to the first electronic device 1400. In step S1411, the first electronic device 1400 outputs the subscription support information as a menu or configuration screen, and generates subscription request information according to a user input. In step S1413, the first electronic device 1400 transmits the subscription request information to the second electronic device 200. In step S1415, the second electronic device 200 transfers the subscription request information to the subscription support server device 301. In this operation, the second electronic device 200 transfers a telephone number (e.g., an MSISDN) of the second electronic device 200 to the subscriptions support sever device 301 so as to receive a specified type of a message (e.g., a type 2 SMS) related to establishment of a secure channel. In step S1417, the subscription support server device 301 requests the provisioning server device 303 to generate or download a profile.

According to various embodiments of the present disclosure, the provisioning server device 303 may generate a communication profile in response to the request to generate or download a profile received from the subscription support server device 301. Furthermore, when the first electronic device 1400 establishes a secure channel to the provisioning server device 303 via the second electronic device 200, the provisioning server device 303 sends a specific type of a message (e.g., an SMS message) to the second electronic device 200 so as to trigger establishment of the secure channel.

In the present example, since the first electronic device 1400 does not have a provisioning profile, the first electronic device 1400 cannot use a cellular network, and is thus unable to directly receive an SMS-type message. Since the first electronic device 1400, for which the provisioning service device 303 will establish the secure channel, does not have a telephone number (e.g., an MSISDN), the provisioning server device 303 is unable to send an SMS message to the first electronic device 1400. Accordingly, in step S1419, the provisioning server device 303 transmits, to the second electronic device 200 connected to the first electronic device 1400, an SMS message for requesting establishment of the secure channel, and, in step S1421, the second electronic device 200 transmits the received SMS message to the first electronic device 1400, so that the secure channel is established. In step S1421, the second electronic device 200 converts the SMS message, so that the first electronic device 1400 is able to receive the SMS message (e.g., convert the type of the SMS message so that the SMS message is compatible with a communication standard (e.g., BT, Wi-Fi, NFC, or the like) used for a connection to the first electronic device 1400). When the secure channel is established, the provisioning server device 303 transmits the communication profile to the first electronic device 1400 in step S1423.

Figure 15:
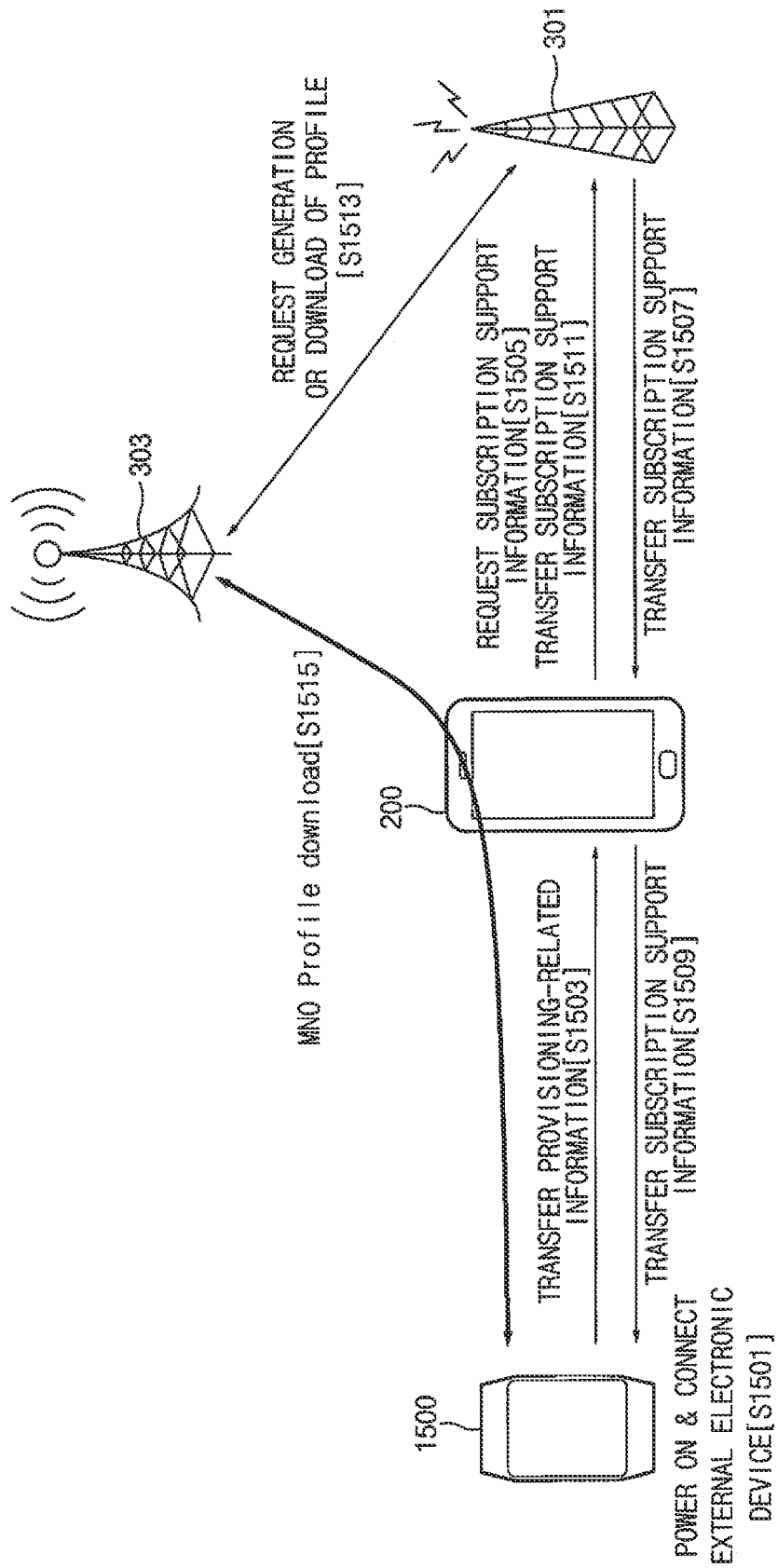
FIG. 15 is a diagram illustrating a flow of signals for using a communication function and a UI function of a second electronic device in relation to a communication profile according to various embodiments of the present disclosure.

FIG. 15 is a diagram illustrating a flow of signals for using a communication function and a UI function of a second electronic device in relation to a communication profile according to various embodiments of the present disclosure.

Referring to FIG. 15, a first electronic device 1500 equipped with an eUICC may be an electronic device that is not equipped with a provisioning profile and is not provided with a UI for a provisioning procedure (e.g., an M2M device such as a sensor device, or a device that has a small display, such as a watch or a band for which provision of a provisioning-related UI is not allowed or is inappropriate). While the first electronic device 1500 is supplied with power, the first electronic device 1500 is connected to the second electronic device 200 according to a user input or a set schedule in step S1501. As the first electronic device 1500 is connected to the second electronic device 200, the first electronic device 1500 transfers provisioning-related information to the second electronic device 200 in step S1503. In step S1505, the second electronic device 200 transmits, to the subscription support server device 301, a subscription support information request related to the first electronic device 1500 based on the provisioning-related information received from the first electronic device 1500, or adds identification information of the second electronic device 200 to the subscription information request information so as to transmit the subscription request information request for requesting associated service items to the subscription support server device 301.

In step S1507, the subscription support server device 301 may transfer, to the second electronic device 200, subscription support information suitable for the first electronic device 1500 in response to the request from the second electronic device 200. Alternatively, the subscription support server device 301 may provide, to the second electronic device 200, the subscription support information suitable for the first electronic device 1500 and the second electronic device 200 (e.g., information including a communication service item enabling association between the first electronic device 1500 and the second electronic device 200). The second electronic device 200 outputs the received subscription support information so as to generate subscription request information automatically or according to a user input. After the subscription request information is generated, in step S1509, the second electronic device 200 transmits, to the first electronic device 1500, subscription information contained in the subscription request information, the subscription information including contract option information and communication profile type information selected by the user input. Furthermore, in step S1511, the second electronic device 200 also transmits the subscription request information to the subscription support server device 301.

The subscription support server device 301 updates a database of the subscription support device 301 or another server device with the subscription request information, and requests the provisioning server device 303 to generate or download a profile, in step S1513. Upon receiving the request to generate or download a profile, the provisioning server device 303 establishes a secure channel to the first electronic device 1500 via the second electronic device 200, and may transfer a communication profile via the channel in step S1515.

Figure 16:
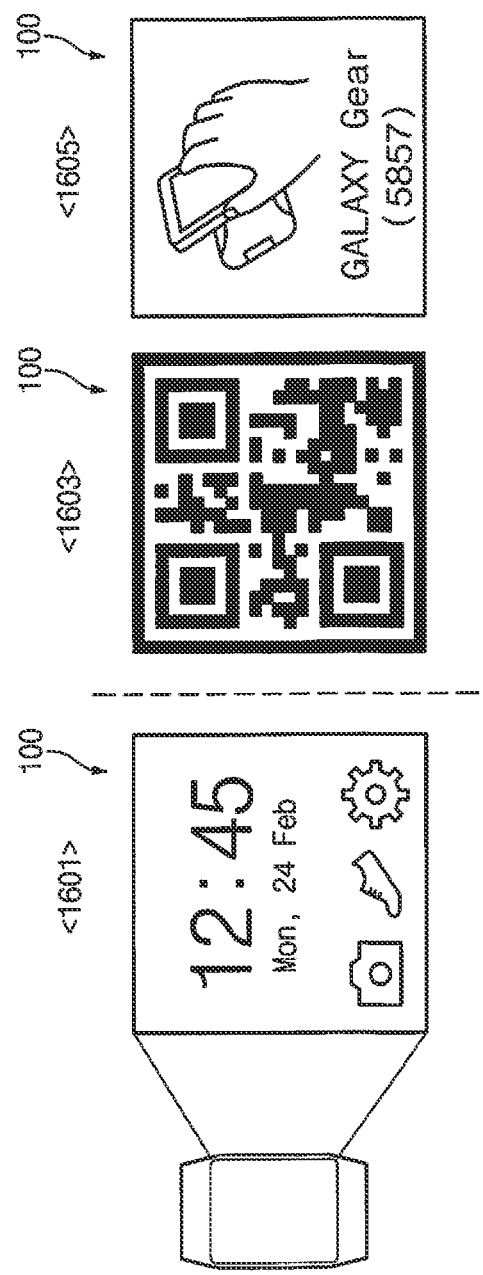
FIG. 16 is a diagram illustrating an example of a provisioning UI of a first electronic device according to various embodiments of the present disclosure.

FIG. 16 is a diagram illustrating an example of a provisioning UI of a first electronic device according to various embodiments of the present disclosure.

Referring to FIG. 16, in the present example, the first electronic device 100 has a limited display. The first electronic device 100 stores a communication protocol for accessing the service device 400 at a current location. According to an embodiment of the present disclosure, as power is supplied to the display of the first electronic device 100 or a display activation request signal is input thereto, the display of the first electronic device 100 outputs information in response to execution of a specified function, as shown in a screen 1601. For example, the first electronic device 100 may display time information in response to execution of a watch function. Furthermore, the first electronic device 100 may output a menu item or icon items related to execution of specified functions (e.g., a camera icon, a shoes icon, a setting icon, or the like).

According to various embodiments of the present disclosure, when a communication profile is not installed in the first electronic device 100, the display of the first electronic device 100 may output code information (QR code) corresponding to provisioning-related information as shown in a screen 1603. For example, after being supplied with power, the first electronic device 100 determines whether a communication profile available for a current location is stored in the first electronic device 100, and, if a communication profile is not stored, the first electronic device 100 may automatically output the code information to the display. Alternatively, if the communication profile is not stored, the first electronic device 100 may output an icon or menu item related to provisioning, and may output the code information in response to output of the icon or menu item.

In relation to output of the code information, the first control module (e.g., an eSIM service manager module) of the first electronic device 100 may add, to the code information, not only information required for establishing a short-range communication channel to the first electronic device 100 (e.g., an IP address, a MAC address, or the like for a Wi-Fi or BT connection) but also information for provisioning (e.g., SRID, EID, or the like). Furthermore, the code information may include information for requesting the second electronic device 200 to turn on a specified communication module (e.g., a Wi-Fi or BT module). Here, the first electronic device 100 may turn on a communication module corresponding to the communication module of the second electronic device 200 requested to be turned on, and may be in a search standby state. If the communication module of the second electronic device 200 is turned on so as to connect the second electronic device 200 to the first electronic device 100, the second electronic device 200 supports a provisioning procedure of the first electronic device 100 based on information received through the code information. According to various embodiments of the present disclosure, a screen to which the code information is output is removed from the display in response to a specified button input or a specified touch input. If the code information is removed, the first electronic device 100 performs a function (e.g., a file playback function, a healthcare function, or the like) other than a communication service.

According to various embodiments of the present disclosure, when the first electronic device 100 does not store a communication profile or is required to perform provisioning, the first electronic device 100 outputs guide information as shown in a screen 1605. The guide information may include, for example, information for requesting a user to tap a specified electronic device (e.g., the second electronic device 200). The guide information may be automatically removed due to an NFC tapping motion of the second electronic device 200. Alternatively, the guide information may be removed in response to a user input. Alternatively, the guide information may be automatically removed after being output for a specified time. If NFC tapping is performed with the second electronic device 200 while the guide information is output, NFC tap information of the first electronic device 100 including the provisioning-related information is provided to the second electronic device 200 to thereby make a provisioning support request.

The provisioning UI of the first electronic device 100 notifies the user that provisioning is required when the provisioning is required, and assists the user to perform the provisioning with ease. The first electronic device 100 may replace a menu or icon of a function that requires a cellular network with an icon or menu of another function so as to configure a UI differently from a normal UI for a state in which a communication service is available, or may display the menu or icon of the function that requires the cellular network such that the menu or icon of the function that requires the cellular network is unable to be used.

Furthermore, as shown in the screens 1603 and 1605, in relation to provisioning, the first electronic device 100 may provide a simple way to connect the second electronic device 200 (e.g., specified button input, specified gesture, specified QR code, specified instruction generation, or the like).

According to various embodiments of the present disclosure, at least one communication profile may be installed in the first electronic device 100 in advance. When the communication profile is installed in advance, the first electronic device 100 outputs the provisioning UI according to whether a communication profile available for a current location exists. For example, if the communication profile available for the current location exists, the normal UI is output as shown in the screen 1601, or, if a communication profile for the current location does not exist, the provisioning UI is output as shown in the screen 1603 or 1605. Here, the code information of the screen 1603 or the tap information of the screen 1605 may include provisioning-related information (e.g., SRID, EID, IMEI, or the like).

Figure 17:
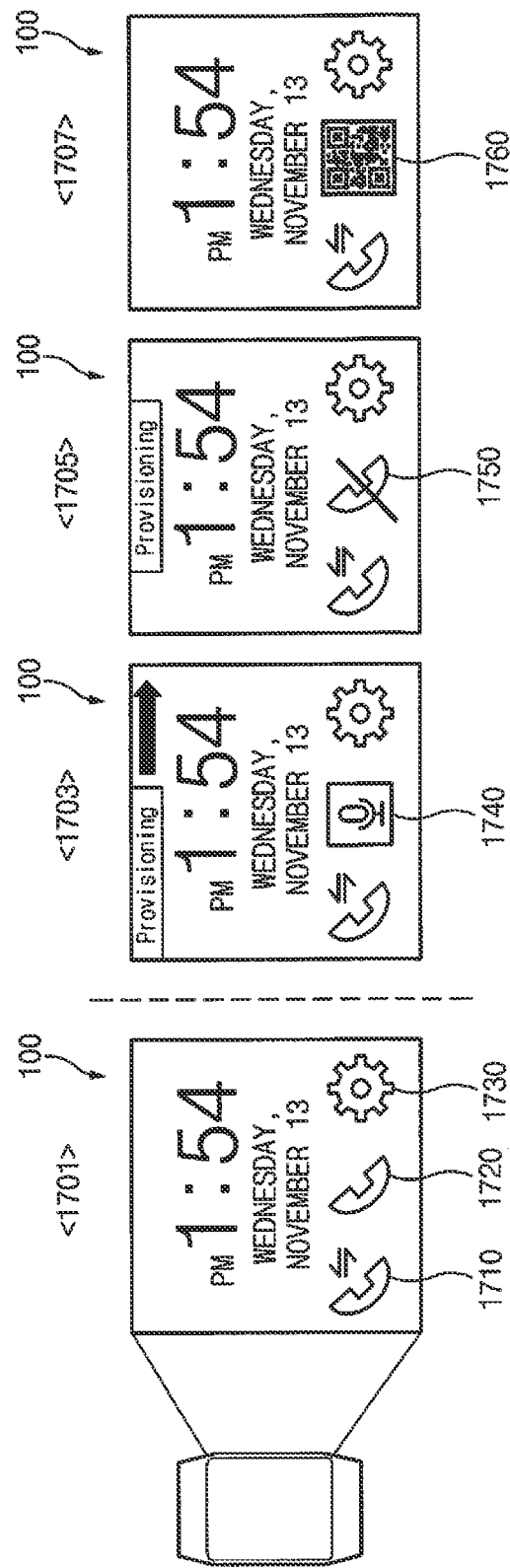
FIG. 17 is a diagram illustrating another example of a provisioning UI of a first electronic device according to various embodiments of the present disclosure.

FIG. 17 is a diagram illustrating another example of a provisioning UI of a first electronic device according to various embodiments of the present disclosure.

Referring to FIG. 17, when a communication profile available for a current location is stored in the first electronic device 100, the first electronic device 100 outputs an icon 1710 of a call function through short-range communications, an icon 1720 of a call function through a built-in modem, and a setting icon 1730 together with time information, as shown in screen 1701.

According to various embodiments of the present disclosure, the first electronic device 100, which requires provisioning, outputs screens as shown in screens 1703 to 1707. For example, as shown in the screen 1703, when provisioning is required, the first electronic device 100 may replace the icon 1720 of the call function through the built-in modem with a recording icon 1740. According to another example in which provisioning is required, the first electronic device 100 may output a call disabled icon 1750 indicating that the call function of the icon 1720 is not available as shown in the screen 1705. Furthermore, when the call disabled icon 1750 is selected, information on a guide to starting the provisioning or an icon for starting the provisioning may be output. According to another example in which provisioning is required, the first electronic device 100 may output code information 1760 related to a provisioning procedure instead of the icon 1720 of the call function through the built-in modem as shown in the screen 1707. The code information 1760 may include information required for establishing a short-range communication connection required for performing the provisioning procedure, or may include the information required for establishing the short-range communication connection and provisioning-related information. The code information 1760 may include, for example, specified virtual button information defined to perform the provisioning procedure, specified gesture information, specified touch motion information, NFC tap guide information, or the like.

As described above, according to various embodiments of the present disclosure, a method for operating an electronic device (e.g., a first electronic device) according to an embodiment of the present disclosure includes establishing a communication channel to an external electronic device by using wired communications or short-range communications, obtaining a communication profile required for operating a second communication module that supports a communication service based on a base station using the external electronic device connected, and storing the obtained communication profile.

According to various embodiments of the present disclosure, the method further includes outputting (or displaying), through the external electronic device, at least a portion of subscription support information required for obtaining the communication profile.

According to various embodiments of the present disclosure, outputting the at least a portion of the required subscription support information includes at least one of receiving the subscription support information to transfer the subscription support information to the external electronic device to output the subscription support information through the external electronic device, and receiving and outputting the external electronic device by the external electronic device.

According to various embodiments of the present disclosure, the method further includes receiving selection information indicating a service contract option or a communication profile selected from the subscription support information from the external electronic device.

According to various embodiments of the present disclosure, the method further includes transmitting subscription request information corresponding to the selection information to a subscription support server device that has provided the subscription support information.

According to various embodiments of the present disclosure, the method further includes transmitting provisioning-related information to the subscription support device based on a provisioning profile related to access to the subscription support server device that supports subscription for the communication service based on the base station.

According to various embodiments of the present disclosure, the method may further include transmitting the provisioning-related information to the subscription support server device via the external electronic device.

According to various embodiments of the present disclosure, the method further includes at least one of outputting information indicating whether a provisioning profile related to access to the subscription support server device that supports subscription for the communication service based on the base station is stored in the electronic device and outputting information indicating whether the communication profile is stored in the electronic device.

According to various embodiments of the present disclosure, the method further includes outputting a specified normal UI if the provisioning profile is stored in the electronic device and outputting a specified provisioning UI related to proceeding with a provisioning procedure if the provisioning profile is not stored in the electronic device.

According to various embodiments of the present disclosure, the method further includes outputting a specified image or specified code information corresponding to the provisioning-related information for proceeding with the provisioning procedure if the provisioning profile exists.

Figure 18:
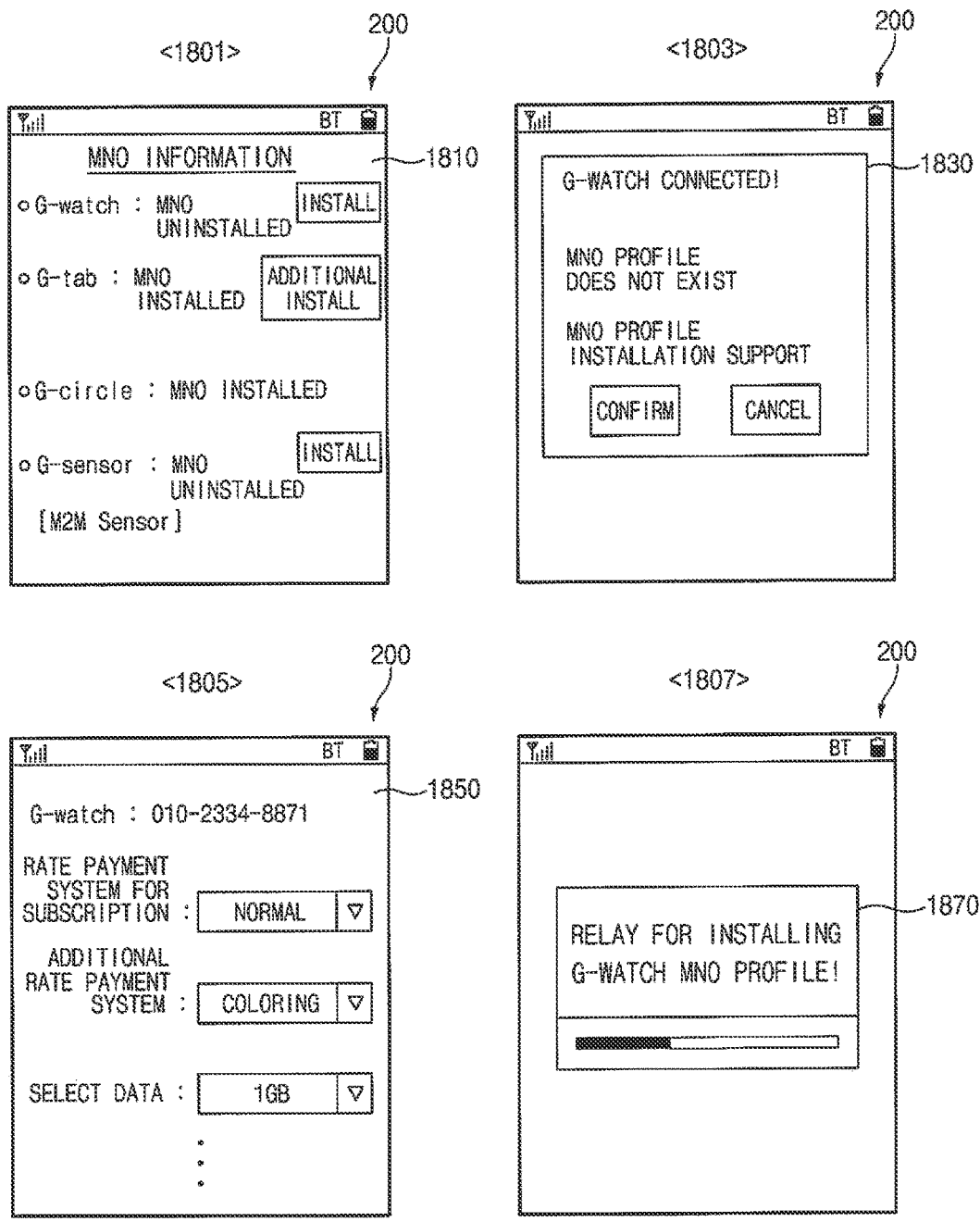
FIG. 18 is a diagram illustrating an example of a screen UI of a second electronic device related to provisioning according to various embodiments of the present disclosure.

FIG. 18 is a diagram illustrating an example of a screen UI of a second electronic device related to provisioning according to various embodiments of the present disclosure.

Referring to FIG. 18, the second electronic device 200 may output various screens in response to a provisioning support request from the first electronic device 100 that requires provisioning. For example, the second electronic device 200 may perform peripheral scanning according to a setting, and may collect device information of at least one external electronic device. When the device information is collected, the second electronic device 200 outputs a list of pieces of the collected device information as shown in a screen 1801. In this operation, the second electronic device 200 determines whether the second electronic device 200 is required to install communication profiles of the external electronic devices. If the second electronic device 200 is required to install the communication profiles of the external electronic devices, the second electronic device 200 may output virtual key buttons for installing the communication profiles to specified locations. For example, if a communication profile is not installed for a G-sensor item, the second electronic device 200 may output a virtual key button (e.g., an installation button) for installing the communication profile (or supporting provisioning). When the communication profile for enabling the external electronic device to use a communication service at a current location is installed, the second electronic device 200 may not output an additional virtual key button, or may provide a virtual key button (e.g., an additional installation button) for installing another communication profile available for the current location such as a G-tab item.

According to an embodiment of the present disclosure, if an installation button of a G-watch item is selected from the screen 1801, the second electronic device 200 establishes a communication channel to the external electronic device corresponding to a G-watch. When the communication channel is established, as shown in a screen 1803, the second electronic device 200 outputs guide information 1830 for notifying the G-watch of completion of establishment of the communication channel, non-existence of a communication profile for the G-watch, and installation support for the G-watch. When a confirmation button is selected from the guide information 1830, the second electronic device 200 may perform provisioning support. If it is determined that the display of the first electronic device 100 is not suitable for subscribing for a communication service (e.g., if a display area of the first electronic device 100 is not at least a specified size), the second electronic device 200 provides a screen for proceeding with a provisioning procedure as shown in a screen 1805. The screen 1805 outputs subscription support information (or a subscription support screen) 1850 received from the subscription support server device 301 on the basis of the provisioning-related information of the first electronic device 100. According to various embodiments of the present disclosure, when an installation button is selected from the screen 1801, the second electronic device 200 skips outputting the information 1830 for requesting a confirmation on the establishment of the communication channel to the first electronic device 100 and the installation support, and outputs the subscription support information 1850, as shown in the screen 1805. The user may select a contract option related to communication service subscription from the screen 1805.

If selection of a communication profile type and a contract option is completed, the second electronic device 200 generates subscription request information corresponding to the selection, and transmits the subscription request information to the subscription support server device 301. The subscription support server device 301 sends a request to the provisioning server device 303 to generate a profile corresponding to the subscription request information and allow downloading of the profile. The provisioning sever device 303 generates the communication profile related to the first electronic device 100, and transfers the communication profile to the first electronic device 100 via the second electronic device 200. In this operation, the second electronic device 200 relays the communication profile to the first electronic device 100. While performing a relay function, the second electronic device 200 outputs progress information 1870 indicating a communication profile download progress, as shown in a screen 1807. When the first electronic device 100 directly establishes a secure channel to the provisioning server device 303 to download the communication profile, since the first electronic device 100 is equipped with a provisioning profile, the second electronic device 200 may skip the outputting the progress information 1870.

The term "module", as used herein, may refer to, for example, a unit including one of hardware, software and firmware or a combination thereof. The term "module" may be interchangeably used with the terms "unit", "logic", "logical block", "component" and "circuit". The "module" may also refer to a minimum unit of an integrated component or may be a part thereof. The "module" may be a minimum unit for performing one or more functions or a part thereof. A module may be implemented mechanically or electronically. For example, a module may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a programming module. The instructions may be configured to perform establishing a communication channel to an external electronic device on the basis of wired communications or short-range communications, obtaining a communication profile required for operating a second communication module that supports a communication service based on a base station using the external electronic device connected, and storing the communication profile obtained.

A module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, a user is allowed to install a communication profile for communication service operation in an electronic device without visiting an agency at which the user has purchased the electronic device. Furthermore, according to the present disclosure, a communication profile for communication service operation may be obtained simply and easily regardless of place or time.

Although, in above-described examples, a process of establishing provisioning for the first electronic device 100 occurs in response to an event triggered in the first electronic device 100, according to alternative embodiments of the present invention, such a process may be performed in response to a triggering event occurring in the second electronic device 200. Further, operations described as being performed by the first electronic device 100 in obtaining and configuring information related to establishing provisioning may be performed by the second electronic device 200, which may be performed based on information regarding the first electronic device provided to the second electronic device 200, in advance, from the first electronic device 100 directly or indirectly, or from another source, such as direct user input to the second electronic device 200.

Similarly, operations described as being performed internally by the second electronic device 200, or in response to user input, prior to the first electronic device 100 establishing communication with a base station, may be performed by the first electronic device 100, and the results of such operations may be provided back to the second electronic device 200, to perform communications with other network entities.

Any information specifically being described as being output or displayed (e.g. LED notification, sound, vibration, display notification etc.) on either one of the first electronic device 100 or the second electronic device 200 may simultaneously or alternatively be output or displayed on the other one of the first electronic device 100 or the second electronic device 200. However, the manner in which this information is output or displayed (including displaying only a portion of the information at the time) may be modified in order to suit the output or other display capabilities of each device.

Similarly, any user input specifically being described as providable to either one of the first electronic device 100 or the second electronic device 200 may simultaneously or alternatively be providable to the other one of the first electronic device 100 or the second electronic device 200. However the manner in which this information is input may be modified in order to suit the input capabilities of each device.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An electronic device comprising:
    a camera;
    a touch screen;
    first communication circuitry configured to establish a short-range communication connection with a wearable electronic device;
    second communication circuitry configured to establish a cellular communication connection;
    at least one processor; and
    memory storing instructions that, when executed by the at least one processor, cause the electronic device to:
    obtain, using the camera, information for establishing the short-range communication connection with the wearable electronic device from a graphical code provided via the wearable electronic device,
    establish, using the first communication circuitry, the short-range communication connection with the wearable electronic device,
    determine whether a communication profile for a cellular network service is installed in the wearable electronic device,
    based on determining that the communication profile is not installed in the wearable electronic device, display, via the touch screen, a button for installing the communication profile in the wearable electronic device,
    based on a selection of the button, display, via the touch screen, a user interface (UI) for subscribing to a cellular network service, received from a first server,
    receive, using the second communication circuitry, a communication profile for the cellular network service for the wearable electronic device, from a second server, and
    transmit, using the first communication circuitry, the received communication profile for the cellular network service to the wearable electronic device.

2. The electronic device of claim 1, wherein the communication profile is related to at least one of an embedded universal integrated circuit card (eUICC), a secure element, or an embedded subscription identity module (eSIM) of the wearable electronic device.

3. The electronic device of claim 1, wherein the memory storing instructions, when executed by the at least one processor, further cause the electronic device to:
    based on determining that the communication profile is installed in the wearable electronic device, not display the button for installing the communication profile in the wearable electronic device.

4. The electronic device of claim 1, wherein the memory storing instructions, when executed by the at least one processor, further cause the electronic device to:
    obtain, using the first communication circuitry, device information, related to at least one of an international mobile equipment identity (IMEI), subscription identity module (SIM) identification, embedded universal integrated circuit card identification (eUICC-ID), or spatial reference identifier (SRID), corresponding to the wearable electronic device, from the wearable electronic device, and
    transmit, using the second communication circuitry, the obtained device information to the second server.

5. The electronic device of claim4claim 1, wherein the UI includes one or more contract options to be selectable by a user,
    wherein the one or more contract options are related to subscribing to the cellular network service.

6. The electronic device of claim 1, wherein the memory storing instructions that, when executed by the at least one processor, further cause the electronic device to:
    display, via the touch screen, progress information indicating progress of transmitting the received communication profile to the wearable electronic device.

7. The electronic device of claim 3, wherein the memory storing instructions, when executed by the at least one processor, further cause the electronic device to:
    based on determining that the communication profile is installed in the wearable electronic device, display, via the touch screen, guide information for notifying that the wearable electronic device has established a communication channel for the cellular network service or a button for installing another communication profile in the wearable electronic device.

8. A method for operating of an electronic device comprising:
    establishing a short-range communication connection with a wearable electronic device based on obtaining, using a camera of the electronic device, at least in part on a graphical code being displayed on a display of the wearable electronic device;
    based at least in part on a determination that a communication profile for a cellular network service is not installed in the wearable electronic device, displaying, via a touch screen of the electronic device, a button for installing the communication profile in the wearable electronic device;
    based on a selection of the button, displaying, via the touch screen of the electronic device, a user interface (UI), received from a first server, for subscribing to a cellular network service;
    receiving a communication profile for the cellular network service for the wearable electronic device, from a second server; and
    transmitting the received communication profile for the cellular network service to the wearable electronic device.

9. The method of claim 8, wherein the communication profile is related to at least one of an embedded universal integrated circuit card (eUICC), a secure element, or an embedded subscription identity module (eSIM) of the wearable electronic device.

10. The method of claim 8, further comprising:
    based at least in part on a determination that the communication profile is installed in the wearable electronic device, not displaying the button for installing the communication profile in the wearable electronic device.

11. The method of claim 8, further comprising:
    obtaining device information, related with at least one of an international mobile equipment identity (IMEI), subscription identity module (SIM) identification, embedded universal integrated circuit card identification (eUICC-ID), or spatial reference identifier (SRID), corresponding to the wearable electronic device from the wearable electronic device through the short-range communication connection, and transmitting the obtained device information to the second server.

12. The method of claim 8, wherein the UI includes one or more contract options to be selectable by a user, and wherein the one or more contract options are related to subscribing to the cellular network service.

13. The method of claim 8, further comprising:

displaying, on the touch screen of the electronic device, progress information indicating progress of transmitting the received communication profile to the wearable electronic device.

14. The method of claim 10, further comprising:

based at least in part on the determination that the communication profile is installed in the wearable electronic device, displaying on the touch screen of the electronic device, guide information for notifying that the wearable electronic device has established a communication channel for the cellular network service or a button for installing another communication profile in the wearable electronic device.

* * * * *

UNITED STATES PATENT AND TRADEMARK OFFICE
CERTIFICATE OF CORRECTION

PATENT NO. : 12,137,499 B2
APPLICATION NO. : 17/411784
DATED : November 5, 2024
INVENTOR(S) : Soon Hyun Cha et al.

Page 1 of 1

It is certified that error appears in the above-identified patent and that said Letters Patent is hereby corrected as shown below:

In the Claims

In Column 46, Line 6, in Claim 5:
"claim4claim 1"
Should be:
-- claim 1 --

Signed and Sealed this
Twenty-seventh Day of May, 2025

Coke Morgan Stewart
*Acting Director of the United States Patent and Trademark Office*